United States Patent
Tanaka et al.

(10) Patent No.: US 6,303,205 B1
(45) Date of Patent: *Oct. 16, 2001

(54) MAGNETIC DISK INCLUDING PROTECTIVE LAYER HAVING SURFACE WITH PROTRUSIONS, AND SUBSTRATE THEREFOR

(75) Inventors: Hideaki Tanaka, Katsuta; Kenichi Gomi, Hitachi; Yoshihiko Miyake, Odawara; Sigeru Sano, Fuji; Youichi Inomata; Hiroshi Yashiki, both of Odawara; Yoshiki Kato, Tokyo; Masaki Ohura, Odawara, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.
This patent is subject to a terminal disclaimer.

(21) Appl. No.: 09/313,283

(22) Filed: May 18, 1999

Related U.S. Application Data

(62) Division of application No. 08/625,159, filed on Apr. 1, 1996, now Pat. No. 5,930,073, which is a continuation of application No. 08/077,874, filed on Jun. 18, 1993, now Pat. No. 5,504,646, which is a continuation-in-part of application No. 07/595,414, filed on Oct. 11, 1990, now Pat. No. 5,285,343.

(30) Foreign Application Priority Data

| Mar. 2, 1990 | (JP) | 2-049281 |
| Apr. 13, 1990 | (JP) | 2-096448 |
| Jun. 19, 1992 | (JP) | 4-160802 |
| Jun. 25, 1992 | (JP) | 4-167265 |
| Oct. 13, 1998 | (JP) | 1-264934 |

(51) Int. Cl.$^7$ .................. B32B 3/02; B32B 3/30; G11B 5/66; G11B 5/70

(52) U.S. Cl. .................. 428/65.3; 428/141; 428/163; 428/167; 428/694 SG; 428/694 TR; 428/900

(58) Field of Search .................. 428/692, 694 R, 428/694 TP, 694 BR, 694 SG, 900, 141, 65.3, 163, 167, 694 TR; 360/97.01, 135

(56) References Cited

U.S. PATENT DOCUMENTS

| 4,688,130 | 8/1987 | Nakanouchi et al. | 360/135 |
| 4,816,933 | 3/1989 | Izumi et al. | 360/131 |

(List continued on next page.)

FOREIGN PATENT DOCUMENTS

| 0130063 | 1/1985 | (EP) . |
| 0218811 | 4/1987 | (EP) . |

(List continued on next page.)

OTHER PUBLICATIONS

*Patent Abstracts of Japan*, vol. 13, No. 54 (P–824), Feb. 8, 1989 (for Japanese Kokai 63–244312 published Oct. 11, 1988.

Primary Examiner—Paul Thibodeau
Assistant Examiner—Holly C. Rickman
(74) Attorney, Agent, or Firm—Antonelli, Terry, Stout & Kraus, LLP

(57) ABSTRACT

A magnetic disk includes a substrate, a magnetic layer, and a protective layer. At least one region of a surface of the magnetic disk has protrusions. A height of each of the protrusions is not less than 5 nm and not greater than 40 nm, and is within ±30% of an average height of the protrusions. A density of the protrusions is not less than 200/mm$^2$ and is not greater than 250,000/mm$^2$. A width of a surface of each of the protrusions in a radial direction of the magnetic disk is not less than 0.1 μm and is not greater than 10 μm. The protrusions are discrete protrusions aligned in a spiral direction of the magnetic disk at a predetermined spacing in the radial direction of the magnetic disk. The at least one region of the surface of the magnetic disk includes flat areas between the protrusions. At least some of the flat areas extend continuously from an inner redius of the at least one region of the surface of the magnetic disk to an outer radius of t he at least one region of the surface of the magnetic disk.

12 Claims, 13 Drawing Sheets

U.S. PATENT DOCUMENTS

| | | | |
|---|---|---|---|
| 4,829,799 | | 5/1989 | Coe et al. .............................. 360/135 |
| 4,939,614 | | 7/1990 | Shirakura et al. .................... 360/135 |
| 5,047,274 | | 9/1991 | Tsuya et al. .......................... 360/135 |
| 5,082,709 | | 1/1992 | Suzuki et al. .......................... 428/64 |
| 5,093,173 | | 3/1992 | Nakagawa et al. ................... 360/135 |
| 5,139,849 | * | 8/1992 | Takagi et al. ......................... 428/143 |
| 5,166,006 | | 11/1992 | Lal et al. ............................... 360/135 |
| 5,202,810 | | 4/1993 | Nakamura et al. ................... 360/135 |
| 5,285,343 | * | 2/1994 | Tanaka et al. ........................ 360/131 |
| 5,353,182 | * | 10/1994 | Nakamura et al. ................... 360/104 |
| 5,374,480 | * | 12/1994 | Nishikawa et al. ................... 428/336 |
| 5,494,721 | * | 2/1996 | Nakagawa et al. ................... 428/64.1 |
| 5,656,349 | * | 8/1997 | Gomi et al. ........................... 428/65.3 |
| 5,930,073 | * | 7/1999 | Tanaka et al. ..................... 360/97.02 |

FOREIGN PATENT DOCUMENTS

| | | |
|---|---|---|
| 57-7135 | 1/1982 | (JP) . |
| 57-20925 | 2/1982 | (JP) . |
| 58-45089 | 10/1983 | (JP) . |
| 59-84348 | 5/1984 | (JP) . |
| 59-124031 | 7/1984 | (JP) . |
| 60-40528 | 3/1985 | (JP) . |
| 60-40530 | 3/1985 | (JP) . |
| 60-231919 | 11/1985 | (JP) . |
| 61-3322 | 1/1986 | (JP) . |
| 63-244312 | 10/1988 | (JP) . |
| 63-249933 | 10/1988 | (JP) . |
| 1-122028 | 5/1989 | (JP) . |
| 1-134720 | 5/1989 | (JP) . |
| 1-224922 | 9/1989 | (JP) . |
| 1-260630 | 10/1989 | (JP) . |
| 2-31323 | 2/1990 | (JP) . |
| 2-208826 | 8/1990 | (JP) . |

* cited by examiner

F I G. 12
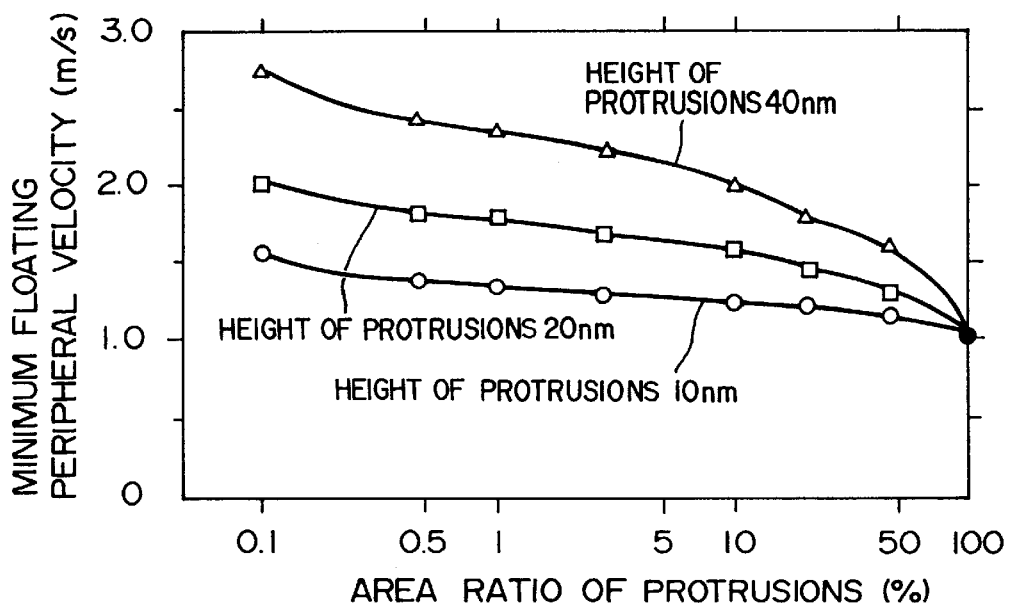
F I G. 13
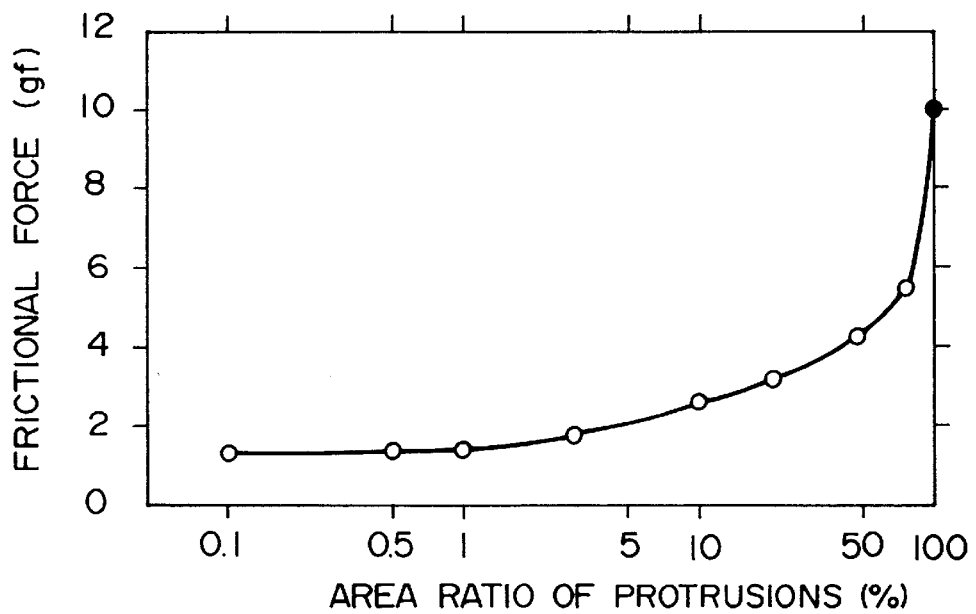

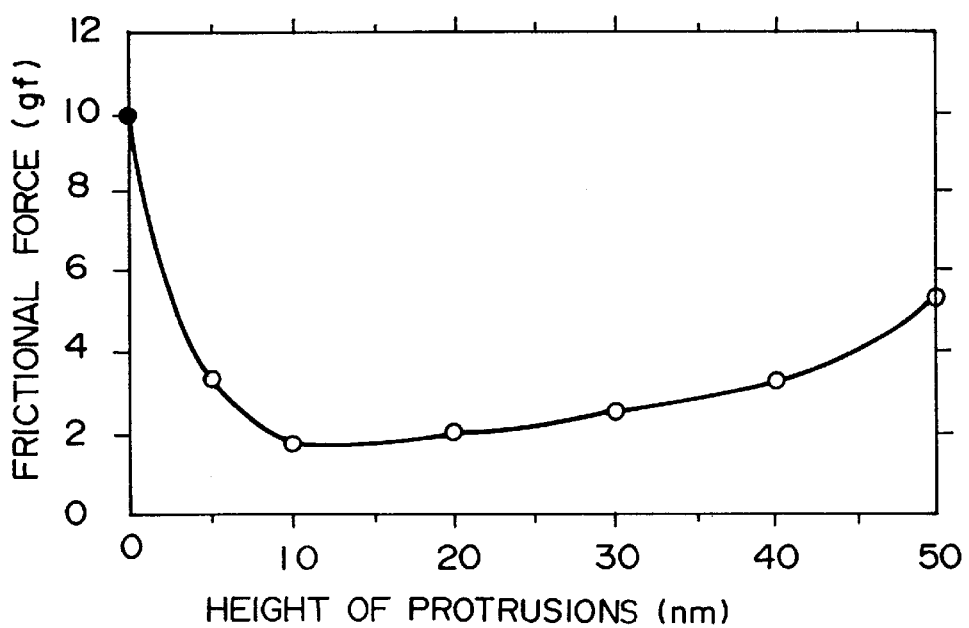
F I G. 14
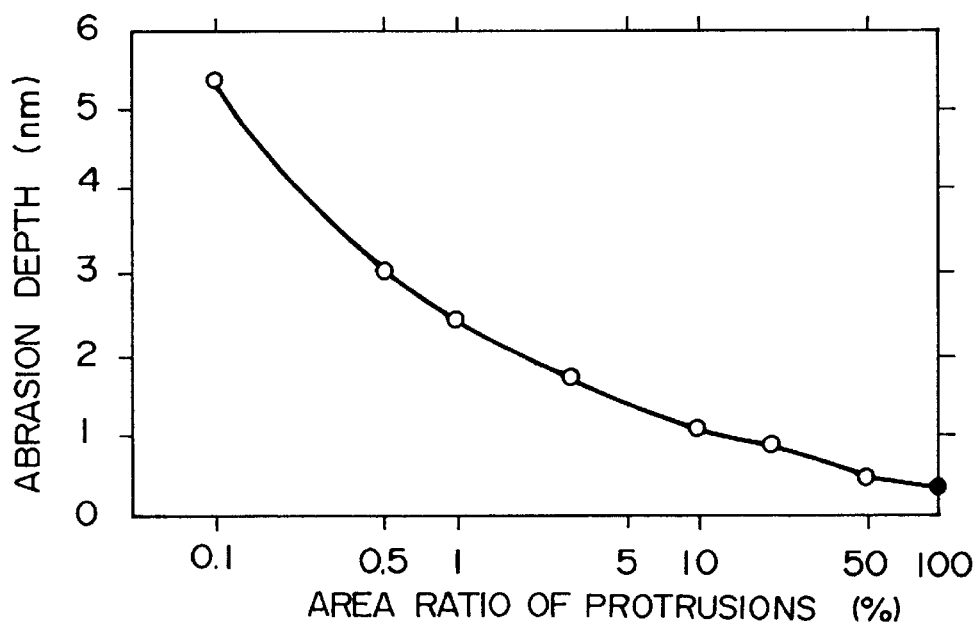
F I G. 15

MAGNETIC DISK INCLUDING PROTECTIVE LAYER HAVING SURFACE WITH PROTRUSIONS, AND SUBSTRATE THEREFOR

CROSS-REFERENCES TO RELATED APPLICATIONS

This application is a division of application Ser. No. 08/625,159 filed on Apr. 1, 1996, now U.S. Pat. No. 5,930,073, which is a continuation of application Ser. No. 08/077,874 filed on Jun. 18, 1993, now U.S. Pat. No. 5,504,646, which is a continuation-in-part of application Ser. No. 07/595,414 filed on Oct. 11, 1990, now U.S. Pat. No. 5,285,343.

BACKGROUND OF THE INVENTION

Field of the Invention

The present invention relates to a magnetic disk apparatus and a magnetic disk which is used in the magnetic disk apparatus.

In recent years, a significance of a magnetic disk apparatus as an external memory device of a computer system has been more and more increased and its recording density has remarkably been improved every year.

It is better to reduce a distance between a magnetic head and a magnetic layer of a magnetic disk (hereinafter referred as "spacing") upon recording/reproduction in order to improve the recording density of the magnetic disk apparatus. To reduce the spacing, a distance between a magnetic head and a surface of a magnetic disk (hereinafter referred as "flying height") is also reduced. To assure the floating stability of the magnetic head in such a case, it is required that the surface of a magnetic disk is as flat as possible.

On the other hand, upon start and stop of the magnetic disk apparatus, a frictional force which is generated between the magnetic head and the magnetic disk causes an abrasion between them and becomes a cause or deterioration of characteristics such as writing characteristic, reading characteristic, and the like. Further, if a moisture or the like exists between the magnetic head and the magnetic disk in a stop state of the magnetic disk, both of them are strongly adsorbed. If the apparatus is started in such a state, a large frictional force occurs between the magnetic head and the magnetic disk and there is a fear such that the magnetic head and the magnetic disk are damaged. There is a tendency such that the above frictional force increases as the surface of the magnetic disk is flat. Such a tendency is contradictory to the requirement for the floating stability of the magnetic head in association with the improvement of the recording density mentioned above.

There has been known a method whereby micro protrusions are formed on the surface of the magnetic disk in order to reduce such a frictional force.

In JP-A-1-134720, for instance, there has been disclosed a method whereby island-like projections are formed on the surface of a magnetic disk.

In JP-A-1-122028, there has been disclosed a method whereby a metal alkoxide solution is coated onto the surface of a magnetic layer of a magnetic disk and is rapidly heated and a protective layer having projections is formed onto the surface of the magnetic layer.

In JP-A-57-20925, there has been disclosed a method whereby cylindrical projections each having a diameter of 0.03 to 0.1 mm and a height of about 0.05 $\mu$m are formed onto the surface of a magnetic layer or a protective layer.

All of the above conventional techniques intend to reduce a flying height of the magnetic head for the magnetic disk and to prevent that, in such a case, a slider to support the magnetic head is adsorbed to the magnetic disk.

In the above conventional techniques, nothing is considered with respect to a point that the floating stability of the magnetic head is continued for a long time.

Further, nothing is considered with respect to a point that a change of a spacing is caused by a change of flying height of the magnetic head due to a difference of a radial position of the magnetic disk, which limits the recording density.

SUMMARY OF THE INVENTION

It is an object of the present invention to provide a magnetic disk which can maintain the floating stability of a magnetic head.

Another object of the invention is to provide a magnetic disk which can set a change of a spacing to be smaller than a change of flying height of a magnetic head due to a difference of a radial position of a magnetic disk.

Still another object of the invention is to provide a magnetic disk apparatus having a magnetic disk which can accomplish the above object. Still another object of the invention is to provide a magnetic disk apparatus which can suppress a flying height of a magnetic head to 0.2 $\mu$m or less and can maintain the floating stability for a long time and also to provide a magnetic disk for the above purpose.

A magnetic disk apparatus of the invention comprises: at least one magnetic disk which essentially has a magnetic layer and a surface protective layer on a substrate; a magnetic head which face the rotating magnetic disk with a micro distance and is supported by a slider; rotating means for rotating the magnetic disk; and an actuator for moving and positioning the magnetic head to a predetermined position on the magnetic disk, wherein a plurality of protrusions each having a flat surface are formed in at least a region which can execute a contact start/stop operation on the surface of the magnetic disk, an area ratio of the protrusions is set to 0.1 to 80% per 1 $mm^2$ a height of the protrusion having the maximum height among the protrusions lies within a range from 5 to 40 nm, and the magnetic layer is formed on the whole surface of the substrate.

The invention is based on the investigation of the fact that the protrusions which satisfy the foregoing requirements are formed in the region which can execute the contact start/stop (CSS) operation on the surface of the magnetic disk and the magnetic layer is formed on the whole surface of the substrate, so that the flying height of the magnetic head is reduced and the floating stability can be maintained.

Thus, the flying height of the magnetic head can be set to a remarkably small value and the flying height of the magnetic head can be held almost constant. Particularly, it is important to control both of the area ratio of the protrusions which are formed on the surface and the protrusion heights to values within predetermined ranges. However, in the conventional techniques, there is no idea such that both of the protrusion area ratio and the maximum protrusion height are controlled to values within specified ranges by paying an attention to them.

The significance of the above technique is particularly remarkable as the flying height of the head is reduced to realize a high recording density of the magnetic disk apparatus, for instance, in the case where the flying height is set to a value within a range from 0.02 to 0.2 $\mu$m.

According to the invention, only the portions of the protrusion surfaces directly face the head and the area ratio of the magnetic disk which is come into contact with the head can be decreased, so that the frictional force with the head can be reduced.

On the other hand, by controlling the maximum protrusion height to a value within a specified range, the fluctuation of the flying height of the head is small, the floating stability of the head can be assured over the whole surface of the magnetic disk, and the fluctuation of the output due to the flying height fluctuation can be prevented.

As mentioned above, the frictional force with the head can be reduced, the output fluctuation can be prevented, and the stable floating of the head can be assured. Therefore, it is possible to obtain a magnetic disk which has a high recording/reproducing accuracy and can cope with a low flying height of the head due to the realization of a high recording density and also to obtain a magnetic recording apparatus using such a magnetic disk.

Further, the protrusions to be formed are arranged so as to rapidly eliminate micro dusts deposited on the head or the magnetic disk, so that a head crush by the micro dusts is difficult to occur and the floating stability of the head can be assured for a long time.

To enable the dusts deposited to the magnetic head or magnetic disk to be promptly eliminated.

(i) it is desirable that the protrusions of the magnetic disk are separated on the same circumference and the same radius, hollows are formed between the protrusions, and an interval between the closest protrusions on the magnetic disk is set to a value within a range from 0.2 to 50 $\mu$m, and (ii) it is particularly desirable to arrange the convex portions so as to face the whole surface of the slider when the slider was put at an arbitrary position on the magnetic disk and the magnetic disk was rotated once.

By satisfying the requirement of the above item (ii), the dusts which are deposited onto the magnetic head and the slider can be scraped off by the protrusions.

By satisfying the requirement of the above item (i), the dusts which were scraped off from the magnetic head and the slider can be discharged to the outside of the slider by using the hollows between the protrusions on the surface of the magnetic disk.

It is preferable that the protrusion has an annular shape which is concentrical or almost concentrical or a spiral shape. The protrusion can be discontinuous by being separated at several positions in the circumferential direction. However, in the case of the discontinuous protrusions, it is desirable that the separated protrusions are regularly or almost regularly arranged when they are seen in the same circumferential direction.

It is desirable that the protrusions are arranged in the radial direction of the disk regularly or at regular intervals. By forming the protrusions in the disk radial direction at regular intervals or at almost regular intervals, there is an effect such that the frictional force can be made substantially constant in the surface.

The inventors et al. have examined with respect to various protrusion convex shapes which are formed on the magnetic disk. Thus, they have found out that it is extremely important that in order to assure the floating stability of the magnetic head for a long time, when a magnetic layer and a surface protective layer are formed onto a substrate and protrusion shapes are given to the surface of the surface protective layer, the arrangement of the protrusions has a function such that the micro dusts deposited on the magnetic head or the magnetic disk can be rapidly eliminated.

In all of JP-A-1-134720, JP-A-1-122028, and JP-A-57-20925 as conventional techniques, nothing is disclosed with respect to a point that the dust eliminating function is provided by the protrusions on the surface of the magnetic disk. On the other hand, the protrusion shapes or the arrangement of the protrusions portions adapted to have the dust eliminating function are not provided.

According to the invention, it is preferable that each of the protrusions on the surface of the magnetic disk has a flat surface. Particularly, it is desirable that the heights of all of the protrusions are held to an almost constant height.

If the surfaces of the protrusions are sharply pointed or the surface of the flat protrusion partially has a sharp projection, the floating stability of the magnetic head deteriorates. In the worst case, there is a fear such that the magnetic disk or the magnetic head is damaged because the magnetic head is come into contact with the magnetic disk.

Further, there is a problem such that unevenness of the protrusion shapes influences on the floating stability of the magnetic head and even if the magnetic head does not come into contact with the magnetic disk, the flying height can easily change. Consequently, it is preferable that the protrusions are regularly or almost regularly arranged.

The fluctuation of the flying height of the magnetic head causes an output fluctuation upon recording/reproduction and becomes a cause of the deterioration of the S/N ratio. Further, since an output of a servo signal to position the magnetic head also fluctuates due to the fluctuation of the flying height, there is also a problem such that the positioning accuracy of the magnetic head deteriorates. The problem by the flying height fluctuation of the magnetic head as mentioned above becomes particularly remarkable as the flying height is reduced to realize a high recording density of the magnetic disk apparatus, for instance, in the cases where the flying height is set to 0.2 $\mu$m or less and where the track width is reduced.

As a reference to determine that the surface of the protrusion is flat, it is desirable that the protrusion surface does not have a projection of a height which exceeds 30% of the maximum protrusion height adjacent hollow) of an arbitrary length, for instance, a length of 100 $\mu$m in the circumferential direction of the surface of the magnetic disk was measured by using a tracer type roughness measuring instrument.

On the other hand, as a reference to determine that the protrusion heights are almost constant, it is desirable that a protrusion of a height which exceeds 30% or is smaller than 30% of the average value of the heights of the protrusions having heights which are equal to or larger than 50% of the maximum protrusion height does not exist when the protrusion height of an arbitrary length, for instance, 100 $\mu$m was measured by using the tracer type roughness measuring instrument.

It is desirable that a distance between the closest protrusions of the magnetic disk lies within a range from 0.2 to 50 $\mu$m.

It is desirable that the number of protrusions is equal to or larger than 200/mm$^2$ and does not exceed 250,000 mm$^2$.

If the protrusions sparsely exist, a turbulence of the air flow can easily occur and a fluctuation of the flying height of the magnetic head can easily occur. On the contrary, if the protrusions fairly densely exist, it becomes difficult to discharge the dusts.

It is preferable that the size of each protrusion is equal to or larger than 0.1 $\mu$m and is equal to or smaller than 10 $\mu$m with respect to the width in the radial direction of the magnetic disk and is equal to or larger than 0.5 $\mu$m and is equal to or smaller than 1 mm with regard to the width in the circumferential direction the magnetic disk.

If the size of each protrusion is smaller than 0.1 μm with respect to the width in the radial direction of the magnetic disk, when the dusts collide with the protrusion there is a fear such that the protrusion is damaged because its strength cannot endure. If the width of the protrusion in the radial direction is larger than 10 μm in the radial direction is larger than 10 μm, it becomes difficult to move the dusts to both of the right and left sides of the protrusion, so that there is a fear such that the dusts are adhered to the surface of the protrusion.

If the width of the protrusion in the circumferential direction is smaller than 0.5 μm, when the dusts collide with the convex portion, its strength is weak. On the contrary, if the width of the convex portion in the circumferential direction is larger than 1 mm, there is a fear such that it becomes difficult to discharge the dusts in the radial direction of the magnetic disk.

It is desirable that the height of the protrusion is higher than 5 nm and is lower than 40 nm and has an almost constant height within a range from 5 nm, to 40 nm. Particularly, a range of 5 to 20 nm is desirable.

Further, in the protrusion forming region on the surface of the magnetic disk, it is desirable that an area ratio of the total area of the protrusions per one $mm^2$ is equal to or larger than 0.1% and is equal to or smaller than 80%. Particularly, a range of 0.5 to 20% is suitable. A range of 1 to 10% is most preferable.

It is desirable that the protrusions are regularly or almost regularly arranged on the surface of the magnetic disk in a manner such that a deviation of the area ratio per one $mm^2$ of the protrusions on the same circumference is equal to or smaller than 20%.

If a distribution of the protrusions is remarkably scattered, there is a fear such that a fluctuation of the flying height of the magnetic head occurs.

It is desirable to also form the bottom surface of the hollow as a flat surface as possible in order to enable the dusts to be easily discharged to the outside of the magnetic disk by using the hollows between the protrusions on the magnetic disk surface.

As a reference to determine that the bottom surface of the hollow is a flat surface, it is desirable that the hollow does not have a projection of a height which exceeds 30% of the maximum height of the protrusion of an arbitrary length, for instance, a length of 100 μm when it is measured by using the tracer type roughness measuring instrument.

Further, in order to enable the dusts to be easily discharged toward the outer periphery of the magnetic disk, it is desirable to arrange the protrusions in a manner such that when the magnetic disk is rotated, the protrusions are positioned so as to be sequentially deviated to the outer peripheral side for the magnetic head.

According to the invention, flying height of the magnetic head can be set to a range from 0.02 to 0.2 μm, which could not be obtained so far, and the flying height can be stably maintained.

The protrusions on the surface of the magnetic disk can be formed by, for instance, the following methods ① to ③.
① The protrusions are directly formed on the surface of the substrate or are formed on the surface of the substrate having an under layer.
② The protrusions are formed on the surface of the magnetic layer.
③ The protrusions are formed on the surface of the protective layer.

In all of the above case ① to ③, the magnetic layer is formed on the whole surface of the substrate and it is desirable that the magnetic layer is not separated by the protrusions.

In the case where the flying height of the magnetic head is set to an extremely small value within a range from 0.02 to 0.2 μm, if protrusions exist on the surface of the magnetic layer, they easily exert an influence on a deterioration of the S/N ratio. Therefore, in the case of remarkably reducing the flying height of the magnetic head as mentioned above, it is preferable to use the method ③ whereby the magnetic layer surface is made flat and the protrusions are formed on the surface protective layer on the magnetic layer.

However, even in the case where the protrusions were formed on the surface of the substrate or the surface of the magnetic layer as in the methods ① and ②, if the shapes of the protrusions formed are substantially maintained until the surface of the magnetic disk, a sufficient effect is obtained to maintain the stability of the flying height.

The substrate of a general magnetic disk comprises an aluminum alloy disk and a hard under layer formed thereon. The under layer can be also omitted in the case of using a disk material having a high hardness such as glass, ceramics, or the like in place of aluminum alloy. All of the disks made of the above materials are included in the present invention, and are generally referred to as substrate. The magnetic layer is formed on the substrate. There is also a case where an intermediate layer is formed between them in order to improve the adhesive property and the characteristics of the magnetic layer. A protective layer is formed on the magnetic layer and a lubricating layer is further formed as necessary, thereby constructing the magnetic disk.

In the invention, both of the protective layer and the lubricating layer are generally lumped together and referred to as a surface protective layer.

The number of protective layers is not limited to only one but a plurality of protective layers can be formed.

The following methods (a) to (d) are preferable as methods of manufacturing the magnetic disk.
(a) A mask pattern is formed on the surface of the protective layer. The protective layer is etched within a range of the film thickness in accordance with the mask pattern. After that, by eliminating the mask pattern, protrusions of desired shapes and dimensions are formed and the lubricating layer is then formed thereon.
(b) A mask pattern is formed on the surface of the protective layer by a lithography technique. The protective layer is etched within a range of the film thickness in accordance with the mask pattern. After that, by eliminating the mask pattern, the protrusions of desired dimensions and shapes are formed. Then, the lubricating layer is formed thereon.
(c) A material which can be hardened by irradiating a light beam, a laser beam, or a beam of charged particles is formed like a film onto the surface of the protective layer. The light beam, laser beam, or charged particle beam is selectively irradiated onto the film surface and the film surface is partially hardened. After that, by eliminating the unhardened portions, protrusions of desired dimensions and shapes are formed. Then, the lubricating layer is formed thereon.
(d) In a method of manufacturing a magnetic recording medium by forming a lubricating layer and two protective layers as a surface protective layer, after the two protective layers were formed, a mask pattern is formed on the surface and the second protective layer serving as the upper layer is etched in accordance with the mask pattern. After that, by eliminating the mask pattern, protrusions of desired dimensions and shapes are formed on the surface of the first protective layer. Then, the lubricating layer is formed.

BRIEF DESCRIPTION OF THE DRAWINGS

FIG. 12 is a graph showing the relation between the area ratio of the protrusions on the surface of the magnetic disk and the minimum floating peripheral velocity of a magnetic head;

FIGS. 13 and 14 are graphs showing the relations among the area ratio of the protrusions on the surface of the magnetic disk, the protrusion height, and the frictional force;

FIG. 15 is a graph showing the relation between the area ratio of the protrusions on the surface of the magnetic disk and the abrasion depth of the surface of the magnetic disk;

DESCRIPTION OF THE PREFERRED EMBODIMENTS

The invention will be practically described hereinbelow.

It is assumed that the protrusions which are formed on the surface of a surface protective layer of a magnetic disk are discontinuous on the same circumference of the magnetic disk. This is because in the case where a magnetic head was held in the stationary state and the magnetic disk was rotated, the magnetic head intermittently faces the protrusions when such a state s seen from a certain point of the magnetic head, so that even if micro dusts were deposited to the magnetic head, they are easily eliminated.

On the other hand, it is desirable that the protrusions which are formed on the surface of the surface protective layer have a discontinuous linear or pit shape and at least a part of the hollows is smoothly continuous from the inner rim to the outer rim of the magnetic disk in the moving region of the magnetic head. This is because even in the case where micro dusts entered the gap between the magnetic head and the magnetic disk, the micro dusts are easily eliminated to the outer peripheral side along the hollows by a centrifugal force.

Figure 4:
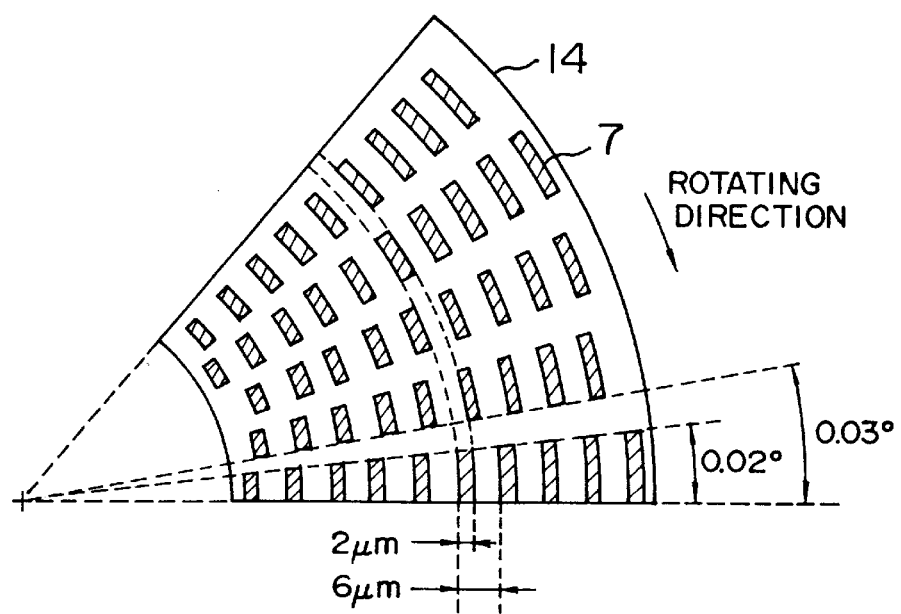
FIGS. 4 to 6 are partial plan views showing arrangements of protrusions which are formed on the surfaces of the magnetic disks of the embodiments of the invention.

The most suitable arrangement of the protrusions which satisfies all of the above conditions is as shown in, for example, FIG. 4.

Figure 9:
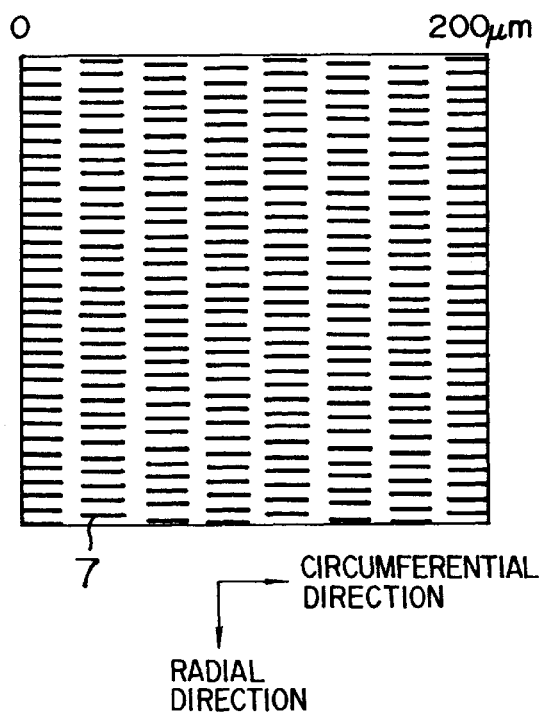
FIGS. 9 to 11 are plan views showing examples of shapes and distributions of the protrusions on the surfaces of the magnetic disks.

FIG. 4 is a diagram showing a state in which arc-shaped protrusions 7 each corresponding to a central angle of, e.g., 0.02° are formed on the whole surface of a magnetic disk 14 along arcs which are concentrical for a rotational center of the magnetic disk so as to have a width of 2 $\mu$m and a pitch of 6 $\mu$m in a manner such that the protrusions are formed every central angle of 0.03° and are sequentially deviated every 2 $\mu$m toward the inner rim side in the rotating direction of the magnetic disk. In the above practical example, in the case where a slider was put on the magnetic disk and the magnetic disk was rotated, the protrusions face the whole surface of he slider while sequentially deviating to the outer rim side, so that there is a large effect such that the dusts adhered to the slider are eliminated. On the other hand, since the notched portions (hollow) of protrusions 7 are linearly continuous from the inner rim of a magnetic disk 14 to the outer rim, even if micro dusts entered the gap between the magnetic head and the magnetic disk, the micro dusts are easily eliminated to the outer peripheral side by the centrifugal force. Actually, the magnetic disk has a shape such that a number of arc-like protrusions as shown in FIG. 4 are arranged on the whole surface. FIG. 9 shows an arrangement of the protrusions of the practical example at a real reduction scale at a position corresponding to a radius of 50 mm of the magnetic disk with respect to a square area whose one side is equal to 200 $\mu$m.

In the above example, an area ratio of the protrusions per one mm$^2$ is about 22% over the whole surface of the magnetic disk. The number of protrusions per one mm$^2$ is set to about 6500 at the position of a radius of 50 mm.

Figure 5:
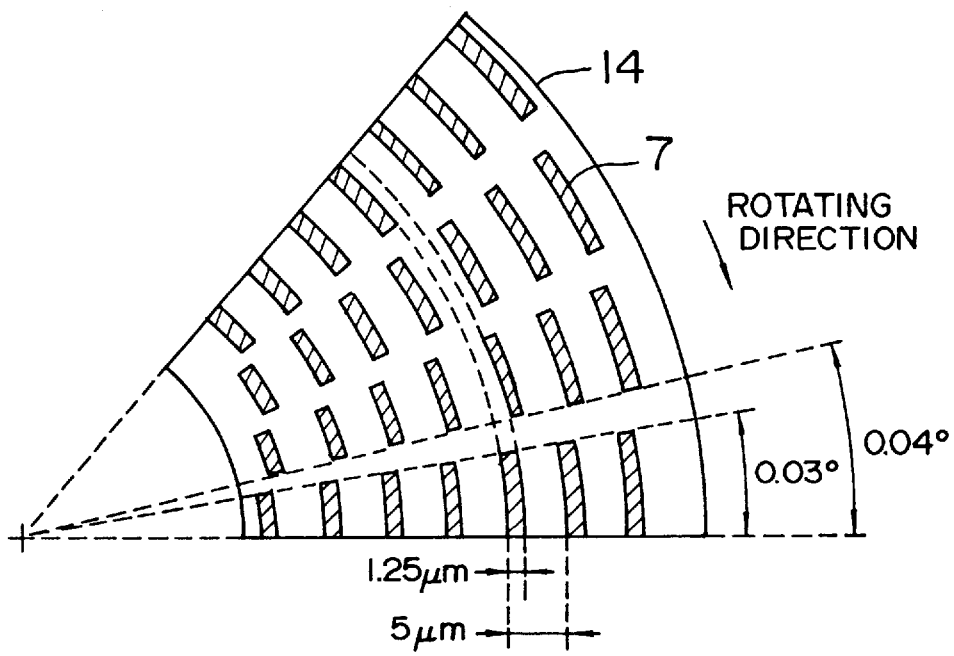
Figure 10:
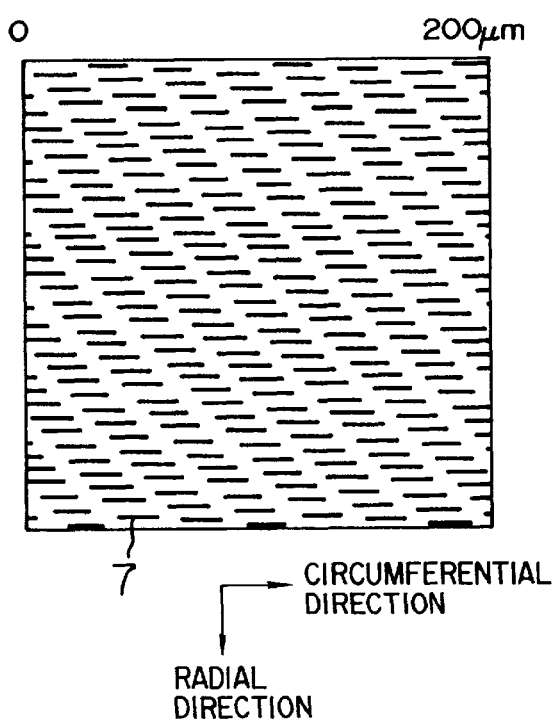

As modified examples of the above practical example, an arrangement of FIG. 5 in which the dimensions are the pitch of the protrusions were changed and an arrangement of FIG. 10 in which an array of the protrusions was obliquely deviated can be mentioned.

Figure 6:
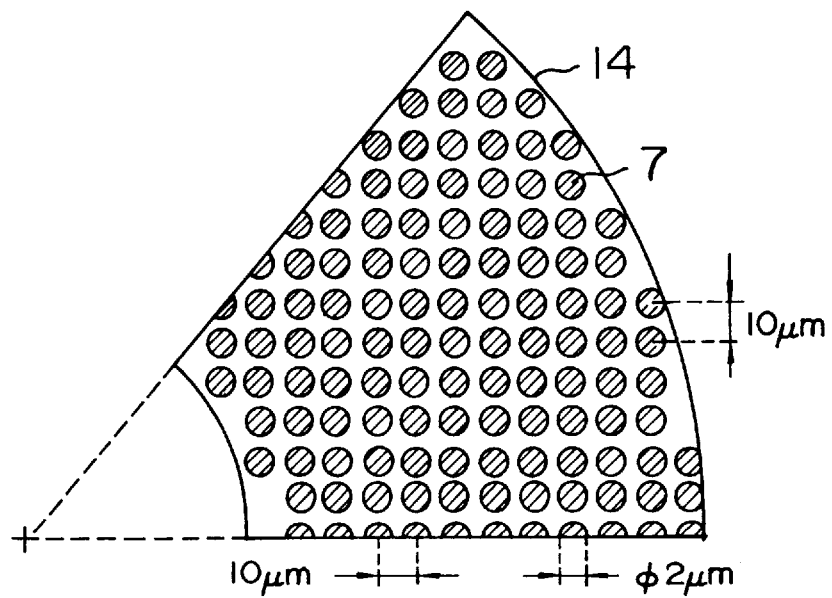

As another example, an arrangement such that pit-like protrusions are regularly arranged on the whole surface in the portions corresponding to vertexes of a regular lattice pattern is suitable. When explaining an example more practically, pit-like portion each having a diameter of, e.g., 2 $\mu$m are arranged on the whole surface in the portions corresponding to the cross points of a square lattice having a pitch of, for example, 10 $\mu$m. FIG. 6 schematically shows an example of the arrangement pattern of the protrusions shown above. Actually, the disk has a shape such that a number of pit-like protrusions 7 as shown in FIG. 6 are arranged on the whole surface. As a lattice pattern which is used here, in addition to the above square lattice, it is possible to use a regular pattern such as triangular lattice, hexagon lattice, or the like. In the case where the protrusions were arranged as mentioned above, when the slider was held in the stationary state and the magnetic disk was rotated, the protrusions intermittently face the whole surface of the slider, so that there is a large effect such that the micro dusts adhered to the slider are eliminated. On the other hand, in the case of the above example, since the hollow is linearly continuous from the inner rim of the magnetic disk to the outer rim, even if micro dusts entered the gaps between the magnetic head and the magnetic disk, the micro dusts can be easily eliminated to the outer peripheral side by the centrifugal force. In the example, the area ratio of the protrusion one $mm^2$ is about 3% over the whole surface of the magnetic disk and the number of protrusions per one $mm^2$ is equal to 10,000 over the whole surface of the magnetic disk.

It is desirable that a height of each of the protrusions which are formed on the surface of the surfaced protective layer is set to an almost constant value within a range which is equal to or larger than 5 nm and is equal to or smaller than 40 nm. When the height of the protrusion is lower than 5 nm, the effect to reduce the frictional force between the magnetic head and the magnetic disk decreases. When the height of the convex portion is higher than 40 nm, a distance between the magnetic head and the magnetic layer of the magnetic disk (spacing) increases upon recording/reproduction, so that an output decreases and the floating stability of the magnetic head is lost. On the other hand, if the heights of the protrusions are not uniform, the high portions function as projections, so that it is unpreferable to accomplish the floating stability.

It is desirable that the area ratio of the protrusions which are formed on the surface of the surface protective layer is equal to or larger than 0.1% and is equal to or smaller than 80%, preferably, it is equal to or larger than 0.5% and is equal to or smaller than 20%. When the area ratio of the protrusions is smaller than 0.1%, the magnetic head is supported by a small area, so that the region of the protrusions is easily abraded and the sliding durability for a long time deteriorates. In addition, when the area ratio of the protrusion is small, there is a fear such that the floating stability of the head is lost. On the contrary, then the area ratio of the protrusions is larger than 80%, the effect to reduce the frictional force between the magnetic head and the magnetic disk decreases.

A range where the protrusions are formed on the surface protective layer can be set to the whole surface of the magnetic disk. However, in the case where a contact start/stop (CSS) zone is specially provided in accordance with the specifications of the magnetic disk apparatus into which the magnetic disk is assembled, the protrusions can be also formed in only the CSS zone portion. This is because the frictional force between the magnetic disk and the magnetic head, influence by the micro dusts, and the like cause problems mainly at the start and stop of the magnetic disk apparatus as mentioned above, and in a state in which the magnetic head is stably floating, the effect to form the protrusions is relatively small.

As a material of the protective layer, it is desirable to use a material having a high hardness from a viewpoint of the abrasion resistance. As such a material, for instance, it is desirable to use a material comprising one kind selected from an oxide, a nitride, and a carbide of a metal such as Al, Si, T, V, Cr, Zr, Nb, Mo, Hf, Ta, W, or the like, and C, BN, and the like or a compound material comprising two or more kinds of the above elements. On the other hand, when considering the magnetic disk apparatus, it is desirable that the hardness of the material of the protective layer of the magnetic disk is equal to or higher than the hardness of the slider material of the magnetic head which is combined. This is because in the case where the abrasion occurred by the sliding motion, if the protective layer is abraded, deterioration of the characteristics of the magnetic disk is easily caused, but the micro abrasion on the slider side is relatively difficult to exert an influence on the characteristics of the magnetic head. As a practical example, of such a combination, for instance, a combination of the above protective layer material and the Mn—Zn ferrite slider or the like can be considered.

A practical method of forming the magnetic disk according to the invention will now be described hereinbelow. A magnetic layer and a protective layer are formed on a nonmagnetic disk-like substrate which was mirror-surface worked. There is also a case where an intermediate layer is formed between the substrate and the magnetic layer. As a method of forming protrusions onto the surface of the protective layer, it is preferable to use a method whereby after a desired mask pattern was formed on the surface of the protective layer by, for instance, a lithography technique, the etching is executed, only the portion which were not covered by the mask pattern are selectively uniformly etched and eliminated until a predetermined depth which is equal to or smaller than the film thickness of the protective layer, and thereafter, the mask pattern is eliminated. As an etching method which is used here, either one of the dry etching such as ion milling, reactive plasma processing, or the like, the wet etching method, and the like is selected in accordance with the material of the protective layer. On the other hand, although a uniform single-layer structure can be used as a protective layer which is used here, if a double-layer structure comprising the upper and lower layers is used and the above pattern formation is executed under the condition such that only the upper layer is etched, protrusions each. having a predetermined height which is made of the material of the upper layer protective layer can be formed onto the lower layer protective layer having a predetermined film thickness.

As another method of forming the protrusions, the protrusions can be also similarly formed by a method whereby a material which can be hardened by irradiating a light beam, a laser beam, or a charged particle beam is formed like a film onto the surface of the protective layer, the light beam, laser beam, or charged particle beam is regularly irradiated to desired positions on the film surface, and the film surface is partially hardened, and thereafter, the unhardened portions are eliminated.

On the other hand, methods other than the above methods can be also used if the shapes of the protrusions which are finally obtained are desired shapes. For example, the protrusions of shapes similar to those mentioned above can be also formed by a method or the like whereby an organic metal gas of the light decomposition type is introduced onto a disk such that a magnetic layer and a protective layer were formed on a nonmagnetic disk which had been mirror-surface worked, the laser beam is periodically and regularly irradiated onto the disk, and the metal is selectively precipitated (laser CVD method).

A lubricating layer is formed as necessary onto the protective layer in which the protrusions were formed on the surface as mentioned above, so that the magnetic disk is derived.

The manufacturing method of forming the protrusions onto the surface of the protective layer has been shown above. However, if the intermediate layer, magnetic layer, protective layer, and lubricating layer each having predetermined thicknesses are formed after the protrusions were formed onto the substrate which had been mirror-surface worked by a method similar to the above method, for instance, the shapes of the protrusions formed on the substrate are substantially maintained until the surface of the magnetic disk, so that a magnetic disk having a similar surface shape can be obtained.

To accomplish the above objects, according to the present invention, there is provided a magnetic disk apparatus comprising: a magnetic disk which has a magnetic layer and a protective layer on a substantially flat substrate and has protrusions and hollows on the surface of the protective layer; and a magnetic head which floats with a micro gap over the magnetic disk which rotates in the recording or reproducing mode, wherein by changing protrusion shapes of the protective layer surface in accordance with a radial position of the magnetic disk, a change of a distance between the magnetic head and the magnetic layer surface of the magnetic disk is set to be smaller than a change of a flying height of the magnetic head due to a difference of the radial position of the magnetic disk.

In the magnetic disk apparatus, it is desirable that a distance between a center plane of the three dimensional surface roughness of the protective layer surface and the magnetic layer surface differs in dependence on the radial position of the magnetic disk, and said distance decreases as the flying height of the magnetic head increases.

In the magnetic disk apparatus, it is desirable that a distance between the magnetic layer surface and a vertex of the protrusion of the protective layer is substantially uniform in the magnetic disk surface, a vacant volume of the hollows of the protective layer surface differs depending on the radial position of the disk, and said vacant volume increases as a flying height of the magnetic head increases.

In the magnetic disk apparatus, further having a linear actuator as a moving mechanism of the magnetic head it is desirable that the vacant volume of the hollows of the disk protective layer surface gradually increases from the inner rim side to the outer rim side of the magnetic disk.

According to the invention, there is also provided a magnetic disk apparatus comprising: a magnetic disk which has a magnetic layer and a protective layer on a substantially flat substrate and has protrusions and hollows on the surface of the protective layer; and a magnetic head which flat with a micro gap over the magnetic disk which rotates in the recording or reproducing mode, wherein a height of protrusion of the protective layer differs depending on the radial position of the magnetic disk, and said height of the protrusion decreases as a flying height of the magnetic head increases.

In the magnetic disk apparatus further having a linear actuator as a moving mechanism of the magnetic head, it is desirable that the height of the protrusion of the protective layer surface of the magnetic disk gradually decreases from the inner rim side to outer rim side of the magnetic disk.

In the magnetic disk apparatus, it is desirable that a reference surface for flying on the magnetic disk for the magnetic head is allowed to gradually approach the magnetic layer surface as a flying height of the magnetic head increases, depending on the radial position of the disk.

In the magnetic disk apparatus, a dual element head having individually a recording element and a reproducing element can be also used as a head. For example, it is desirable to use a dual element head in which a reproducing element using a magnetoresistive effect and an induction type recording element are combined.

In the magnetic disk apparatus, it is desirable that a recording density per one track on the outer rim side of the disk is larger than that on the inner rim side.

According to the invention, there is provided a magnetic disk which has a magnetic layer and a protective layer on a substantially flat substrate and has protrusions and hollows on the surface of the protective layer, wherein a distance between the magnetic layer surface and a vertex of the protrusion of the protective layer is substantially uniform in the magnetic disk surface, and a vacant volume of the hollows of the protective layer surface differs depending on the radial position of the magnetic disk.

In the magnetic disk, it is desirable that the vacant volume of the hollows of the protective film surface gradually increases from the inner rim side of the magnetic disk to the outer rim side.

According to the invention, there is also provided a magnetic disk which has a magnetic layer and a protective layer on a substantially flat substrate and has protrusions on the surface of the protective layer, wherein a height of protrusion of the protective layer surface of the magnetic disk is changed in accordance with the radial position of the magnetic disk.

In the magnetic disk, it is desirable that the height of protrusion of the protective layer surface of the magnetic disk gradually decreases from the inner rim side to the outer rim side of the magnetic disk.

In brief, according to the invention, there is provided means for setting the change of the distance between the magnetic head and the magnetic film surface of the magnetic disk (namely, spacing) to be smaller than the change of the flying height amount of a magnetic head due to a difference of the radial position of the magnetic disk.

In the magnetic disk apparatus, when the disk rotates, an air enters the space between the head and the disk and an air flow occurs and the head floats by a pressure generated in this instance. A flying height in this instance is mainly decided by the linear velocity upon rotation of the disk and a skew angle of the magnetic head. On the assumption that the disk has an ideal flatness, the flying height of the head is expressed by a distance between the disk surface and the head. When protrusions exist on the disk surface, the definition of the flying height is slightly complicated. A concept of the reference surface for flying regarding the invention will now be described. The reference surface for flying is defined as an average surface of the disk which is recognized by the head when the head floats. In case of the ideally flat disk as mentioned above, the reference surface for flying coincides with the disk surface. In case of using a disk having protrusions on the surface, according to the result of the examination by the inventors et al., it is possible to consider that the reference surface for flying is approximately a center plane of the three-dimensional surface roughness. The flying height of the head when it is seen from the reference surface for flying hardly depends on the protrusion shapes of the disk surface. Such a flying height increases together with an increase in linear velocity and decreases with an increase in skew angle of the magnetic head.

On the other hand, the spacing which is used in the invention is defined as a distance between the head and the magnetic layer surface of the disk when the head floats. As will be obviously understood from the definition, the spacing is expressed by the sum of the flying height of the head and the distance between the reference surface for flying and the magnetic layer surface of the disk.

Since the flying height increases with an increase in linear velocity and a decrease in skew angle as mentioned above, the flying height cannot help changing on the different radial position of the disk. The present inventors et al. have examined various methods for suppressing the spacing change due to a change of flying height on the different radial position of the disk. The inventors et al. consequently found out that the distance between the reference surface for flying and the magnetic film surface can be changed by forming special protrusion shapes onto the surface of a protective film that is formed on the magnetic film. Due to this, the spacing change occurring due to the flying height change on the different radial position of the disk can be reduced.

As a disk which is used here, it is desirable that the disk has at least a magnetic layer and a protective layer on a substantially flat substrate and that the protrusions are formed on the surface of the protective layer. Due to this, since the magnetic layer can be substantially flattened, a fluctuation of a reproduction output occurring due to a roughness of the magnetic film is suppressed and a magnetic disk apparatus having excellent recording and reproducing characteristics can be obtained.

In the case where protrusions exist on the surface of the protective layer of the disk, it is possible to consider that the reference surface for flying is a center plane of the three-dimensional surface roughness as already mentioned above. Therefore, as the center plane of the three-dimensional surface roughness approaches a magnetic layer surface, the reference surface for flying more approaches the magnetic layer surface. Namely, by gradually approaching the center plane of the surface roughness to the magnetic layer surface, as a flying height of the head increases, the reference surface for flying can be allowed to gradually approach the magnetic film surface. Consequently, the increase of the spacing can be set to be smaller than the increase of the flying height. A deterioration of the recording and reproducing characteristics due to the spacing increase can be suppressed due to this.

To change the center plane of the surface roughness, it is desirable that at least one of a height of protrusion, area ratio of protrusion, and thickness of the protective layer on hollows is changed on the different radial position of the disk.

It is desirable that the protrusion shapes of the disk surface is set to be almost constant on the same circumference of the disk. This is because since the linear velocity and the skew angle are constant on the same circumference, when the protrusion shapes change, such a change becomes a cause of the spacing fluctuation.

In the invention, distance between the magnetic layer surface of the disk and the vertex of the protrusion of the protective layer (namely, thickness of the protective layer at the protrusions) can be substantially uniform in the surface of the disk. There is a danger such that the head is come into contact with the disk when the start and stop operations of the magnetic disk apparatus is done or due to a seeking operation of the head or the like even during the stationary rotation of the disk. In such a case, since such a contact occurs at the vertex of the protrusion on the disk side, the minimum value of the film thickness of protective film in the protrusions is determined from viewpoints of the durability and reliability at that time. On the other hand, since it is better to set the thickness of protective film as thin as possible for the purpose of reduction of the spacing, it is desirable that the thickness of protective layer in the protrusions is equal to the minimum value that is determined from the viewpoints of the durability and reliability and is almost constant in the disk surface.

In this case, the center plane of the surface roughness approaches the magnetic layer surface as the vacant volume of the hollows increases. For example, the vacant volume can be changed by changing area ratio of protrusions while height of protrusions is set constant on the different radial position of the disk. The vacant volume can be also changed by changing height of protrusions while area ratio of protrusions is set constant. By these methods, the center plane of the roughness (namely the reference surface for flying) can be controlled.

Also in the invention, distance between the magnetic layer surface and the vertex of the protrusion (namely, thickness of the protective layer at the protrusions) can be changed on the different radial position of the disk. At a radial position where the flying height is small, wear of protrusions is accelerated. Therefore, the thickness of the protective layer at the protrusions can be set greater as the flying height of the head decreases. For example, height of protrusions can be increased as the flying height decreases, while the thickness of the protective layer at the hollows and area ratio of the protrusions are set constant.

As a head which is used in the magnetic disk apparatus of the invention, a dual element head which individually has a recording element and a reproducing element can be also used. For example, it is desirable to use the dual element head in which a reproducing element using a magnetoresistive effect and an induction type recording element are combined. A reproduction output in the reproducing element using the magnetoresistive effect is directly influenced by the change in spacing. In case of using such a head in the magnetic disk apparatus of the invention, since a reduction of the reproduction output on the radial Position where the flying height become great can be suppressed, it is particularly desirable.

In the magnetic disk apparatus of the invention, since the deterioration of the recording and reproducing characteristics on the radial position of the disk where the flying height becomes great, such as on an outer radial position, can be suppressed, it is also possible to increase a recording density of the disk on the radial position where the flying height becomes great. Consequently, a recording density of the whole apparatus can be remarkably raised.

In brief, the invention has means for setting the increase of the distance between the magnetic head and the magnetic film surface of the magnetic disk (namely, spacing) to be smaller than the increase of the flying height of the magnetic head due to the difference of the radial position of the magnetic disk. According to the invention, by suppressing the spacing change different radial positions of the disk, a magnetic disk apparatus which is suitable for realization of a high recording density and has a reliability can be provided. Further, a magnetic disk which is used in such an apparatus can be provided.

Figure 8:
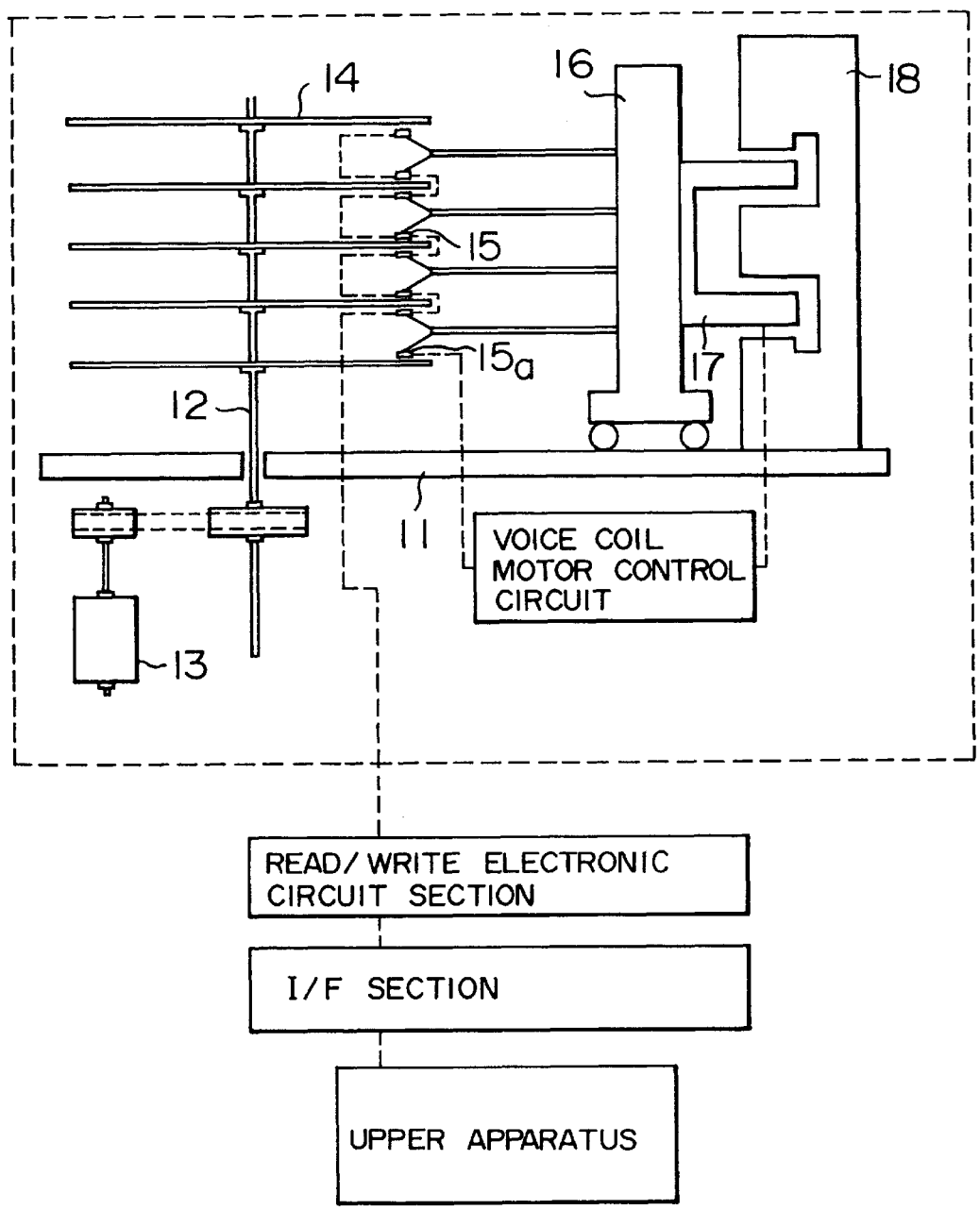
FIG. 8 is a schematic constructional diagram showing an embodiment of a magnetic disk apparatus of the invention.

FIG. 8 is a schematic diagram showing a construction of a magnetic disk apparatus according to an embodiment of the invention.

The magnetic disk apparatus includes component elements indicated by reference numerals 11 to 18 and a voice coil motor control circuit shown in FIG. 8.

Reference numeral 11 denotes a base and 12 indicates a spindle.

A plurality of disk-shaped magnetic disks 14 are attached to one spindle as shown in the diagram.

FIG. 8 shows an example in which five magnetic disks 14 were attached to one spindle. However, the number of magnetic disks is not limited to five.

On the other hand, it is also possible to install a plurality of structures in each of which a plurality of magnetic disks 14 were attached to one spindle 12.

Reference numeral 13 denotes a motor, namely, magnetic disk rotation control means for driving the spindle 12 to thereby rotate the magnetic disks.

Reference numeral 15 indicates a magnetic head for data and 15a indicates a positioning magnetic head.

Reference numeral 16 denotes a carriage, 17 a voice coil, and 18 a magnet.

A voice coil motor is constructed by the voice coil 17 and the magnet 18.

The head is positioned by the elements 16, 17, and 18. Therefore, the elements 16 to 18 are generally referred to as an actuator.

The voice coil 17 and the magnetic head 15a are connected through the voice coil motor control circuit.

In FIG. 8, an upper apparatus denotes, for instance, a computer system having a function to process the information recorded in the magnetic disk apparatus. In the recording and reproducing method of such an apparatus, the magnetic head is in contact with the magnetic disk before the start of the operation. However, by rotating the magnetic disk, a space is formed between the magnetic head and the magnetic disk and the recording or reproducing operation is executed in such a state. At the end of the operation, the rotation of the magnetic disk is stopped and the magnetic head and the magnetic disk again come into contact with each other. Such a method is called a contact start/stop method, which will be referred to as a CSS method hereinafter.

Embodiment 1

An under film of Ni—P of a thickness of 15 μm was formed on the surface of an aluminum alloy disk having an outer diameter of 5.25 inches by an electroless plating method. The under film was abraded until a thickness of 10 μm and was mirror-surface worked so that an average roughness (Ra) is equal to or less than 3 nm and the maximum roughness ($R_{max}$) is equal to or less than 7 nm when they were measured by using the tracer type surface roughness measuring instrument.

A Cr intermediate layer of a thickness of 0.2 μm, a Co—Ni magnetic layer of a thickness of 40 nm, and a C protective layer of a thickness of 20 nm were formed onto the substrate obtained as mentioned above by a sputtering method. A positive type resist (OFPR800 made by Tokyo Apolied Chemical Co., Ltd.) of a thickness of about 0.5 μm was coated onto the surface of the C protective layer. A photo mask having a shape as shown in FIG. 4 which had been formed so as not to transmit the light through only the protrusions was adhered onto the resist and was exposed. After that, the disk was developed and a mask pattern having a shape shown in FIG. 4 in which the resist remains in only the protrusions was formed on the surface of the C protective layer.

An argon ion beam was irradiated onto the whole surface of the disk for 30 seconds by using the ion milling apparatus and the positions in which the mask pattern is not formed were uniformly etched. After that, the mask pattern was eliminated by using a resist eliminating liquid and the protrusions which were regularly arranged on the surface of the protective layer were formed.

A lubricating agent of the perfluoro polyether system of a thickness of about 5 nm was coated as a lubricating layer onto the surface of the disk which had been derived as mentioned above and a magnetic disk was formed. The heights of the protrusions formed were measured at arbitrary ten points of the surface of the magnetic disk by using the scanning tunneling microscope (STM) and the tracer type surface roughness measuring instrument. Thus, the heights of the protrusions at all of the measuring points were 10 nm. The surface of the magnetic disk obtained was measured by an Auger electron spectral method. Thus, it has been confirmed that Co and Ni were not detected and no exposed portion of the magnetic layer exist. The dimensions of the protrusions and the distance between the protrusions were as shown in FIG. 4.

Figure 1:
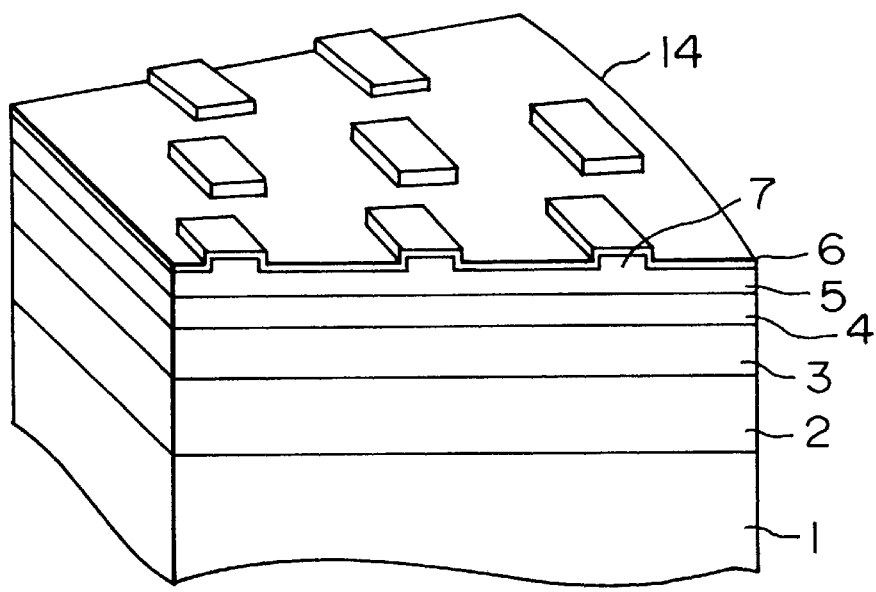
FIGS. 1 to 3 are perspective views showing cross sectional structures in the radial direction of magnetic disks according to embodiments of the present invention.

FIG. 1 shows a schematic diagram of a cross sectional structure in the radial direction of the magnetic disk of the embodiment. In FIG. 1, reference numeral 1 denotes an aluminum alloy disk; 2 indicates an under layer; 3 an intermediate layer; 4 a magnetic layer; 5 a protective layer; and 6 a lubricating layer. A substrate is constructed by the disk and the under layer 2. In the embodiment, the area ratio of the protrusions is about 22% for the whole surface.

Embodiment 2

Figure 7:
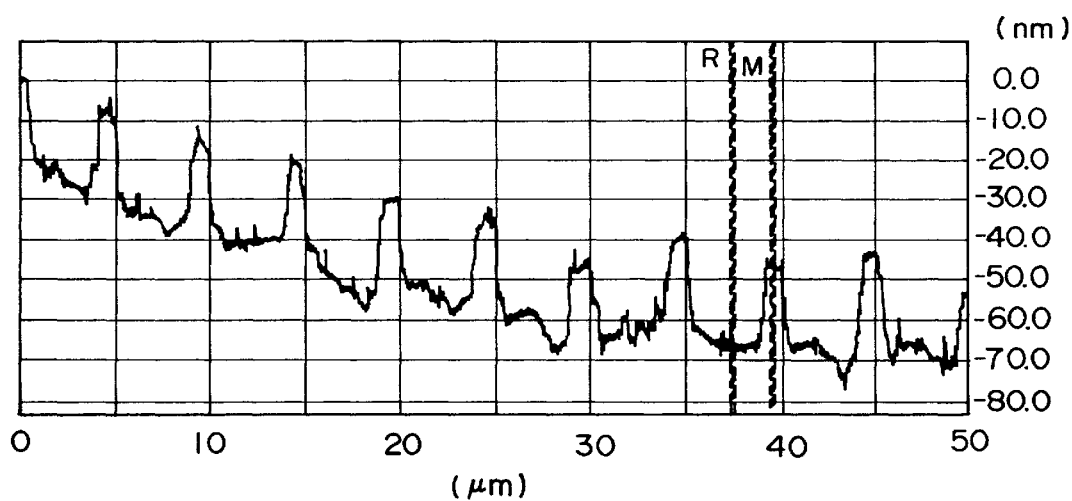
FIG. 7 is a graph showing an example of the result in the case where a protrusion forming portion of the magnetic disk according to an embodiment of the invention was measured in the radial direction by using a tracer type surface roughness measuring instrument.

A magnetic disk was formed by a method similar to the embodiment except that a photo mask having a shame shown in FIG. 5 which was formed so as not to transmit the light through only the protrusions was used and the thickness of a C protective layer was set to 30 nm and the etching time by the ion milling to form the protrusions was set to one minute. The heights of the protrusions were measured at arbitrary ten points of the surface of the magnetic disk by the scanning tunneling microscope and the tracer type surface roughness measuring instrument. Thus, the heights of the protrusions were 20 nm at all of the measuring points. The dimensions of the protrusions and the distance between the protrusions were as shown in FIG. 5. FIG. 7 shows an example of the results in the case where the protrusion forming portions on the surface of the magnetic disk according to the embodiment were measured in the radial direction by the tracer type surface roughness measuring instrument. In the embodiment, the area ratio of the convex portions was about 10% for the whole surface.

Embodiment 3

A magnetic disk was formed by a method similar to the embodiment 1 except that a photo mask having a shape shown in FIG. 6 which was formed so as not to transmit the light through only the protrusions was used. The heights of the protrusions were measured at arbitrary ten points on the surface of the magnetic disk by the STM and the tracer type surface roughness measuring instrument. Thus, the heights of the protrusions were 10 nm at all of the measuring points. The dimensions of the protrusions and the distance between the protrusions were as shown in FIG. 6.

Figure 2:
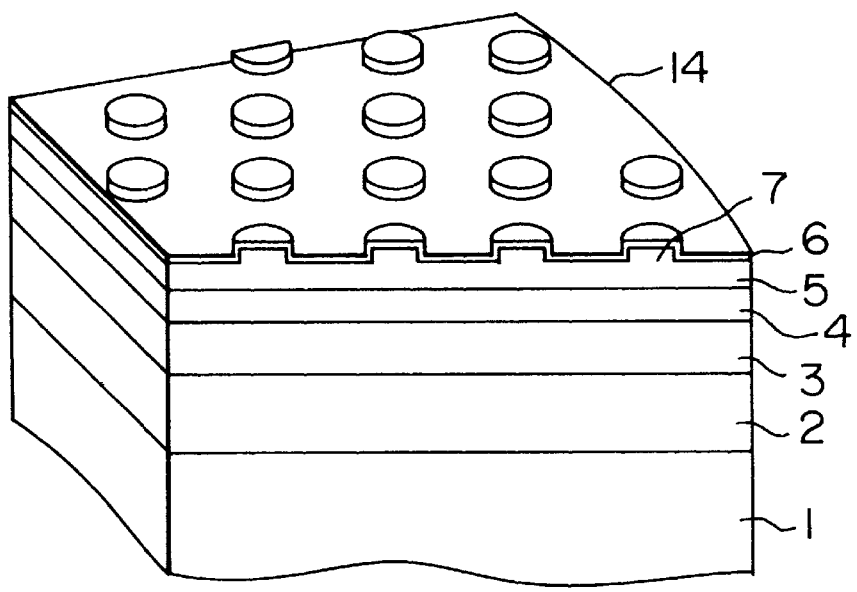

FIG. 2 shows a schematic diagram of a cross sectional structure in the radial direction of the magnetic disk of the embodiment. In the embodiment, the area ratio of the protrusions was about 3% for the whole surface.

Embodiment 4

A magnetic disk was formed by a method similar to the embodiment 3 except that an SiC layer of a thickness of 20 nm was formed as a protective layer by a sputtering method and the etching time by the ion milling to form the protrusions was set to 20 seconds. The heights of the protrusions were measured at arbitrary ten points on the surface of the magnetic disk by the tracer type surface roughness measuring instrument. Thus, the heights of the protrusions were 10 nm at all of the measuring points.

Embodiment 5

A magnetic disk was formed by a method similar to the embodiment 3 except that a C film (what is called an i-C) having a thickness of 20 nm which was formed by a plasma CVD method using methane-hydrogen mixture gases as a raw material was used as a protective layer and the etching time by the ion milling to form the protrusions was set to one minute. The heights of the protrusions were measured at arbitrary ten points on the surface of the magnetic disk by the tracer type surface roughness measuring instrument. Thus, the heights of the protrusions were 10 nm at all of the measuring points.

Embodiment 6

A Cr intermediate layer of a thickness of 0.21 $\mu$m, a Co—Ni magnetic layer of a thickness of 40 nm, an SiC film as a first protective layer of a thickness of 10 nm, and a C film as a second protective layer of a thickness of 10 nm were formed by a sputtering method onto a substrate similar to that in the embodiment 1. A mask pattern was formed onto the surface of the C second protective layer by a method similar to the embodiment 3 and was subjected to an oxygen plasma for one minute by using an oxygen ashing apparatus. After that, the mask pattern was eliminated by a resist eliminating liquid. The surface of the disk obtained was analyzed. Thus, in the portion without the mask pattern, it has been found that the C film was extinguished by the etching using the oxygen plasma and the SiC film was exposed and the C film remained like a protrusion in only the portion of the mask pattern. The heights of the protrusions were measured at arbitrary ten points on the surface of the disk by the tracer type surface roughness measuring instrument. Thus, the heights of the protrusion were 10 nm at all of the measuring points. Therefore, it has been found that the SiC film was hardly etched by The oxygen plasma.

A lubricating agent of the perfluoro polyether system of a thickness of about 5 nm was coated as a lubricating layer onto the surface of the disk obtained as mentioned above and the magnetic disk was formed.

Embodiment 7

A Cr intermediate layer of a thickness to 0.2 $\mu$m, a Co—Ni magnetic layer of a thickness of 40 nm, and an SiC layer of a thickness of 10 nm as a protective layer were formed by a sputtering method onto a substrate similar to that of the embodiment 1. A solution of tetrahydroxy silane of a thickness of about 15 nm was spin coated onto the surface of the SiC protective layer. After that, an Ar laser beam which was converged into a spot diameter of 2 $\mu$m was selectively irradiated to only the protrusions in accordance with the pattern shown in FIG. 4. Tetrahydroxy silane of the irradiated portion was changed to $SiO_2$ and hardened. After that, tetrahydroxy silane of the unhardened portion was washed and eliminated, so that the protrusions which were regularly arranged on the surface of the protective layer were formed as shown in FIG. 4.

A lubricating agent of the perfluoro polyether system of a thickness of about 5 nm was coated as a lubricating layer onto the surface of the disk obtained as mentioned above and the magnetic disk was formed. The heights of the protrusions formed were measured at arbitrary ten points on the surface of the magnetic disk by the tracer type surface roughness measuring instrument. Thus, the heights of the protrusions were 10 nm at all of the measuring points.

In the embodiment, the area ratio of the convex portions was about 22% for the whole surface.

Embodiment 8

A magnetic disk was formed by a method similar to the embodiment 1 except that a reinforced glass disk of an outer diameter of 5.25 inches which has been mirror-surface worked in a manner such that the average roughness ($R_a$) was equal to or smaller than 2 nm and the maximum roughness ($R_{max}$) was equal to or less than 5 nm when they were measured by the tracer type surface roughness measuring instrument was used as a substrate. The heights of the protrusions were measured at arbitrary ten points on the surface of the magnetic disk by the tracer type surface roughness measuring instrument. Thus, the heights of the protrusions were 10 nm at all of the measuring points.

Embodiment 9

Figure 11:
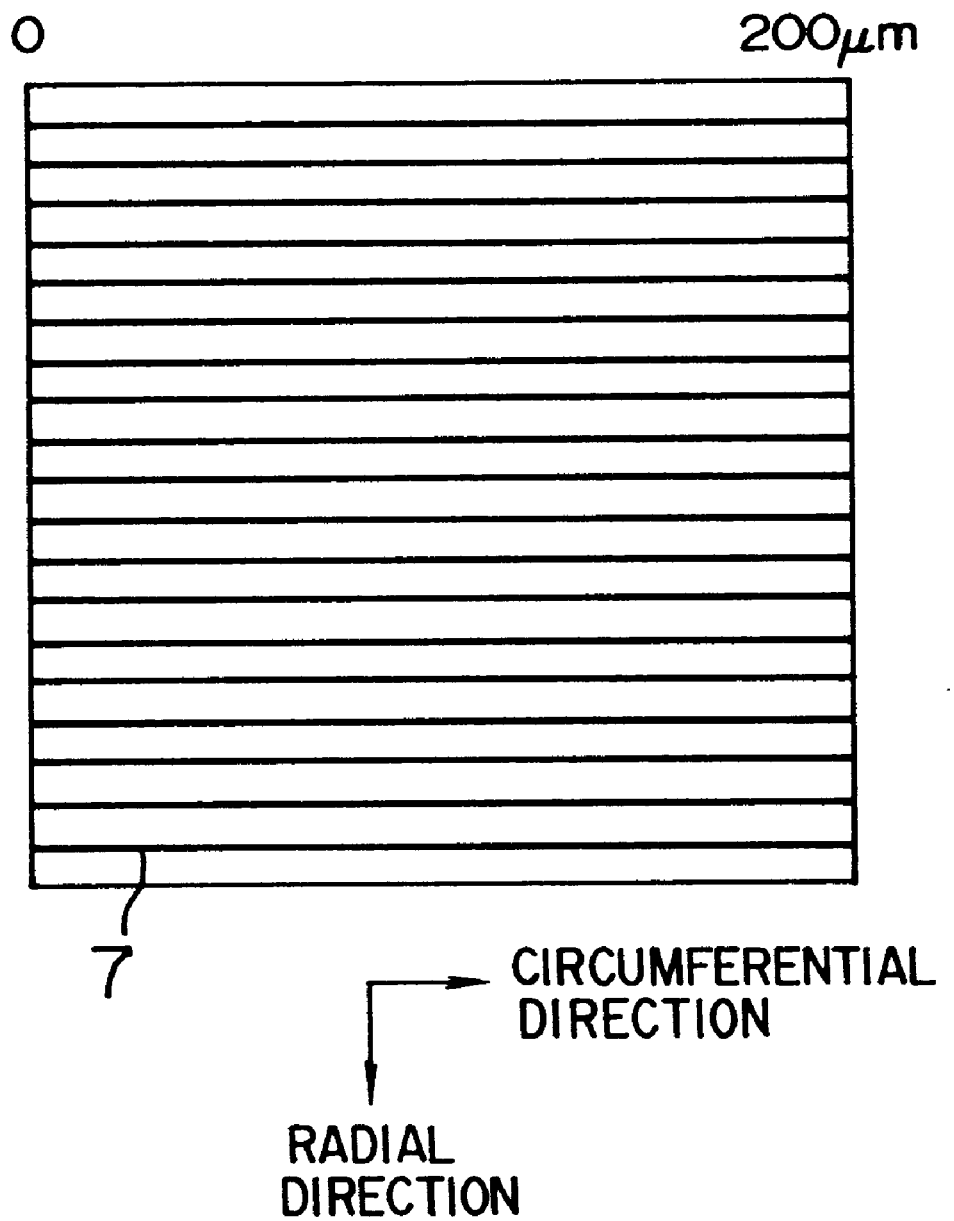

A magnetic disk was formed by a method similar to the embodiment 1 except that a photo mask having a width of 2 $\mu$m and a pitch of 10 $\mu$m which was formed so as not to transmit the light through the concentrical portions was used. The surface of the magnetic disk was observed by an electron microscope, so that it has been found that the concentrical protrusions having a width of 2 $\mu$m and a pitch of 10 $\mu$m were formed on the whole surface. The heights of the protrusions were measured at arbitrary ten points on the surface of the magnetic disk by the STM and the tracer type surface roughness measuring instrument. Thus, the heights of the protrusions were 10 nm at all of the measuring points. The arrangement of the protrusions of the embodiment was as shown in FIG. 11.

In the embodiment, the area ratio of the protrusions was 20% for the whole surface.

Embodiment 10

By a method similar to the embodiment 1, a mask pattern was directly formed onto a substrate similar to that in the embodiment 1 and an argon ion beam was irradiated to the whole surface for ten seconds by an ion milling apparatus. After that, the mask pattern was eliminated and protrusions which were regularly arranged on the surface of the substrate were formed. The heights of the protrusions were measured at arbitrary ten points on the surface of the substrate by the tracer type surface roughness measuring instrument. Thus, the heights of the protrusions were 10 nm at all of the measuring points.

An intermediate layer, a magnetic layer, and a protective layer were formed on the substrate by a sputtering method by a method similar to the embodiment 1. A lubricating agent of the perfluoro polyether system of a thickness of about 5 nm was directly coated as a lubricating layer onto the protective layer and a magnetic disk was formed. The heights of the protrusions were measured at arbitrary ten points on the surface of the magnetic disk by the tracer type surface roughness measuring instrument. Thus, the heights of the protrusions were 10 nm at all of the measuring points. It has been found that the shapes of the protrusions formed on the substrate were substantially maintained until the surface of the magnetic disk.

Figure 3:
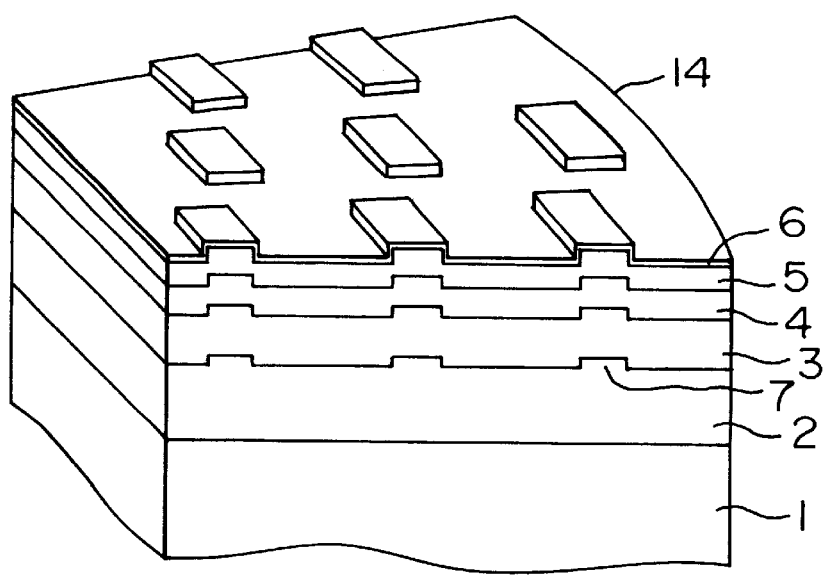

FIG. 3 shows a schematic diagram of a cross sectional structure in the radial direction of the magnetic disk of the embodiment.

Embodiment 11

Magnetic disks in which the area ratio of the protrusions and the heights of the protrusions were changed were formed by using a method similar to the embodiment 10 except that the shape of the photo mask and the etching time by the ion milling to form the protrusions were changed.

Magnetic disks in which the area ratio of the protrusions was changed from 0.1 to 80% by changing the arrangement pitch of the protrusions and the dimensions of the protrusions by using a photo mask having a shape similar to the shape shown in FIG. 6 were formed. For example, in the case where the area ratio of the protrusions is set to 0.1%, the arrangement pitch of the protrusions was set to 40 µm and the diameter of each protrusions was set to 1.4 µm. As another example, in the case where the area ratio of the protrusions is set to 50%; the arrangement pitch of the protrusions was set to 12.5 µm and the diameter of each protrusions was set to 10 µm.

Magnetic disks in which the heights of the protrusions were changed in a range from 5 to 50 nm by changing the etching time by the ion milling in a range form 5 to 50 seconds with respect to the shapes in which the area ratio of the protrusions were changed were formed. The heights of the protrusions were measured by the tracer type surface roughness measuring instrument.

COMPARISON EXAMPLE 1

An intermediate layer, a magnetic layer, and a protective layer were formed onto a substrate similar to that in the embodiment 1 by a sputtering method by a method similar to the embodiment 1. A lubricating agent of the perfluoro polyether system of a thickness of about 5 nm was directly coated as a lubricating layer onto the protective layer and a magnetic disk was formed. No protrusions was formed.

COMPARISON EXAMPLE 2

While a substrate similar to that in the embodiment 1 is rotated, a buffer in which an abrasive grain was impregnated was pressed onto the substrate and the substrate was abraded so that a continuous groove was formed substantially along the circumferential direction. The surface of the substrate obtained was measured by the tracer type surface roughness measuring instrument. Thus, the average roughness ($R_a$) was 10 nm and the maximum roughness ($R_{max}$) was 35 nm.

An intermediate layer, a magnetic layer, and a protective layer were formed by a sputtering method onto the above substrate by a method similar to the embodiment 1. A lubricating agent of the perfluoro polyether system of a thickness of about 5 nm was directly coated as lubricating layer onto the protective layer and a magnetic disk was formed.

COMPARISON EXAMPLE 3

A Cr intermediate layer of a thickness of 0.2 µm, a Co—Ni magnetic layer of a thickness of 40 nm, and a C film of a thickness of 40 nm as a protective layer were formed by a sputtering method onto a substrate similar to that in the embodiment 1. While the disk is rotated, a buffer in which an abrasive grain was impregnated was pressed onto the disk and the C protective layer was abraded until a thickness of about 10 nm and a groove was formed substantially along the circumferential direction. A lubricating agent of the perfluoro polyether system of a thickness of about 5 nm was coated as a lubricating layer onto the surface of the disk and a magnetic disk was formed.

The surface of the magnetic disk obtained was measured by the tracer type surface roughness measuring instrument. Thus, the average roughness ($R_a$) was 10 nm and the maximum roughness ($R_{max}$) was 30 nm.

COMPARISON EXAMPLE 4

A Cr intermediate layer of a thickness of 0.2 µm, a Co—Ni magnetic layer of a thickness of 40 nm, and a C film of a thickness of 30 nm as a protective layer were formed onto a substrate similar to that in the embodiment 1 by a sputtering method. The disk was anti-sputtered in a sputtering apparatus and the C protective layer was etched until a thickness of about 10 nm.

A lubricating agent of the perfluoro polyether system of a thickness of about 5 nm was coated as a lubricating layer onto the surface of the disk derived and a magnetic disk was formed.

The surface of the magnetic disk obtained as mentioned above was measured by the tracer type surface roughness measuring instrument. Thus, the average roughness ($R_a$) was 8 nm and the maximum roughness ($R_{max}$) was 15 nm.

The frictional forces of the magnetic disks with the magnetic head, the abrasion depths of the surfaces of the magnetic disks, and the minimum floating peripheral velocity (the minimum peripheral velocity at which the magnetic head does not come into contact with the projecting portions on the magnetic disk) were measured before and after the CSS test was executed 30,000 times with respect to the magnetic disks in which the area ratio of the protrusions and the heights of the protrusions were changed in the embodiment 11. In FIGS. 12 to 15, which will be described hereinbelow, in the cases where the area ratio of the protrusions is set to 100% and the heights of the protrusions were set to 20 nm, the results regarding the magnetic disks on which no protrusions was formed in the comparison Example 1 were shown.

FIG. 12 shows the relation among the area ratio of the protrusions, the heights of the protrusions, and the minimum floating peripheral velocity. It will be understood from the result of the diagram that when the heights of the protrusions are large, the minimum floating peripheral velocity is large, that is, it is difficult to stably float up the head by reducing the gap between the head and the magnetic disk. On the other hand, when the area ratio of the protrusions is small as well, the minimum floating peripheral velocity increases.

FIG. 13 shows the relation between the area ratio of the protrusions and the frictional force in the case where the heights of the protrusions were set to a constant value of 10 nm. It will be understood from the result of FIG. 13 that it is necessary to reduce the area ratio of the protrusions in order to decrease the frictional force.

FIG. 14 shows the relation between the heights of the protrusions and the frictional force in the case where the area ratio of the protrusions was set to a constant value of 3%. The result of FIG. 14 shows that the heights of the protrusions must be controlled within a certain range in order to reduce the frictional force.

FIG. 15 shows the relation between the area ratio of the protrusions and the abrasion depth of the surface of the magnetic disk in the case where the heights of the protrusions were set to a constant value of 10 nm. The result of FIG. 15 shows that it is necessary to increase the area ratio of protrusions in order to reduce the abrasion depth.

From the above result, it will be understood that both of the area ratio of the protrusions and the heights of the protrusions need to be controlled to values within specified ranges in order to obtain the good floating stability of the head and the good sliding durability performance which is specified by the frictional force and the abrasion death.

It is desirable that the area ratio of the protrusions is equal to or larger than 0.1% and is equal to or smaller than 80%, more preferably, it is equal to or larger than 0.5% and is equal to or smaller than 20%, and most preferably, it is equal to or larger than 1% and is equal to or smaller than 10%.

It is desirable that the height of each protrusion is equal to or larger than 5 nm and is equal to or smaller than 40 nm, preferably, it is equal to or larger than 5 nm and is equal to or smaller than 20 nm.

It is desirable to control the area ratio of the protrusions and the heights of the protrusions to values within specified ranges in the surface of the magnetic disk in order to uniform the floating stability of the head and the slide durability in the surface of the magnetic disk. For instance, it is desirable that a deviation of the area ratio of the convex portions lies within 20%.

The magnetic disk apparatus shown in FIG. 6 was constructed by using an Mn—Zn ferrite magnetic head with respect to the magnetic disks obtained in the embodiments 1 to 10 and the comparison examples. The CSS test was executed about 30,000 times. Before and after this was done, ① the inspection of the outside appearance, ② the measurement of the frictional force with the magnetic head, ③ the measurement of the minimum floating peripheral velocity of the magnetic head, and ④ the test of the recording and reproduction in the CSS regions were executed. The flying height of the magnetic head in the stationary rotation at the inner position was set to 0.1 μm. The results of the tests are shown in Table 1.

TABLE 1

(Each numerical value was obtained after execution of 30,000 CSS tests. Each numeral value in [ ] was obtained at the initial stage before the CSS tests.)

| | The number of CSS tests until the occurrence of damage | Frictional force (gf) | Minimum floating peripheral velocity (m/sec) | Recording/reproduction tests The number of errors per circumference | S/N ratio (dB) |
|---|---|---|---|---|---|
| Embodiment 1 | >30,000 | 3.2 [1.5] | 1.2 [1.2] | 0 [0] | 34 [35] |
| Embodiment 2 | >30,000 | 3.3 [1.5] | 1.4 [1.4] | 0 [0] | 31 [32] |
| Embodiment 3 | >30,000 | 1.0 [1.4] | 1.2 [1.2] | 0 [0] | 33 [35] |
| Embodiment 4 | >30,000 | 1.9 [1.3] | 1.3 [1.3] | 0 [0] | 32 [34] |
| Embodiment 5 | >30,000 | 1.8 [1.3] | 1.3 [1.3] | 0 [0] | 34 [35] |
| Embodiment 6 | >30,000 | 1.7 [1.3] | 1.3 [1.3] | 0 [0] | 33 [35] |
| Embodiment 7 | >30,000 | 3.1 [1.4] | 1.2 [1.2] | 0 [0] | 32 [33] |
| Embodiment 8 | >30,000 | 3.2 [1.4] | 1.2 [1.2] | 0 [0] | 35 [36] |
| Embodiment 9 | 25,000 | 3.4 [1.5] | 1.5 [1.2] | 2 [0] | 31 [34] |
| Embodiment 10 | >30,000 | 3.1 [1.5] | 1.2 [1.2] | 0 [0] | 30 [31] |
| Comparison Example 1 | 5,000 | 10.2 ]4.0] | 5.3 [1.0] | 34 [0] | 19 [35] |
| Comparison Example 2 | 10,000 | 8.0 [1.5] | 4.6 [2.3] | 11 [2] | 21 [26] |
| Comparison Example 3 | 10,000 | 8.3 [1.5] | 4.3 [2.4] | 11 [1] | 24 [29] |
| Comparison Example 4 | 10,000 | 8.2 [1.4] | 4.3 [2.2] | 7 [0] | 26 [30] |

According to the embodiment, micro protrusions which are regularly arranged so that micro dusts adhered to the magnetic head or the magnetic disk can be promptly eliminated are formed on the surface of the recording disk, so that it is possible to obtain a magnetic disk in which a frictional force and an adsorbing force with the magnetic head are small, good recording and reproducing characteristics are obtained, the floating stability of the magnetic head is guaranteed, and the deterioration of the characteristics is small for a long time.

Figure 16A:
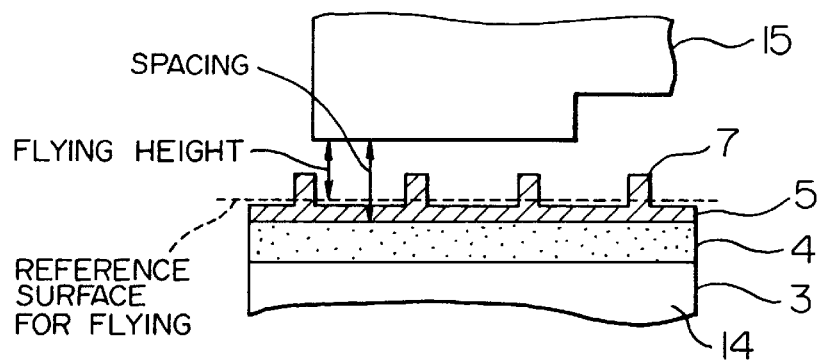
FIGS. 16A and 16B are schematic diagrams showing the relation between the spacing and the flying height of the magnetic head on the magnetic disk having protrusions according to an embodiment of the invention.
Figure 16B:
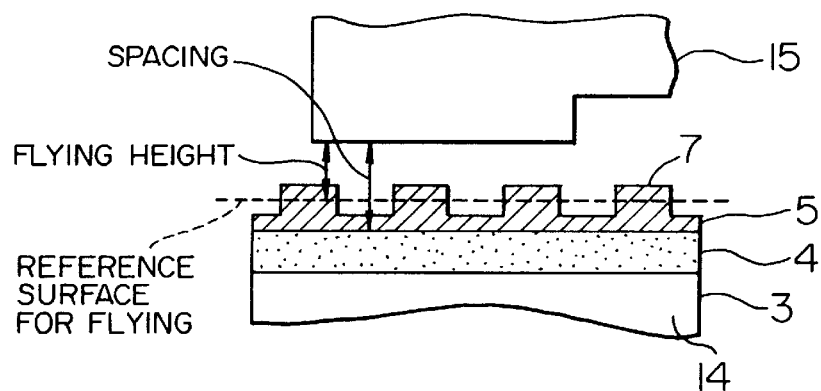
Figure 16C:
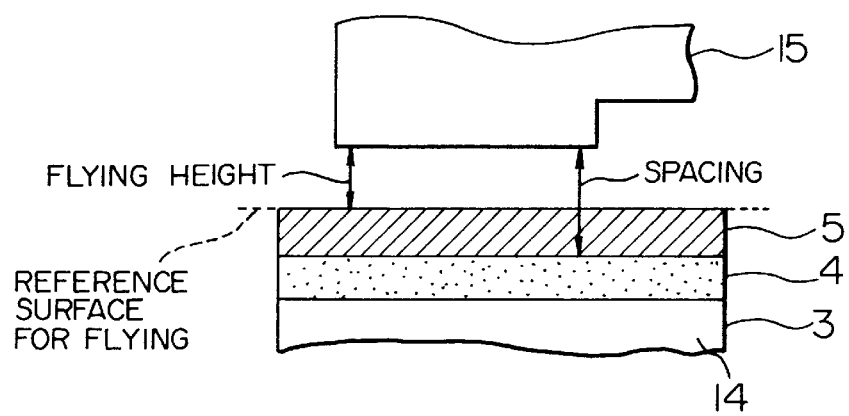
FIG. 16C is schematic diagram showing the relation between the spacing and the flying height of the magnetic head on the magnetic disk having a flat surface according to a comparison example of the invention.

The spacing control of the invention will now be described referring to FIGS. 16A, 16B and 16C. FIGS. 16A and 16B show the relation between the flying height and the spacing in the case where protrusions are formed on the surface of the protective layer of the disk. When no protrusions are formed on the protective layer, the reference surface for flying of the disk for the head coincides with the surface of the protective film as shown in FIG. 16C. In this case, the spacing is expressed by the sum of the flying height and the thickness of the protective layer. On the other hand, in the case where protrusions exist on the surface of the protective layer, the reference surface for flying of the disk for the head is approximately expressed by the center plane of the three-dimensional roughness portions according to the results of the examination by the present inventors et al. Therefore, as the vacant volume of the hollows becomes larger, the reference surface for flying more approaches the surface of the magnetic layer as can be seen by comparing FIG. 16A with FIG. 16B. The spacing is expressed by the sum of the distance between the surface of the magnetic layer and the reference surface for flying and the flying height.

According to the results of the examination by the present inventors et al., when it is now assumed that the linear velocity upon rotation of the disk is constant, the flying height when it is seen from the reference surface for flying doesn't depend on the presence or absence of the protrusions portions of the surface of the protective layer and the vacant volume of the hollows. Therefore, as the reference surface for flying approaches the surface of the magnetic layer, namely, as the vacant volume of the hollows of the surface of the protective layer increases, the spacing can be reduced as can be seen by comparing FIG. 16A. with FIG. 16B.

In the magnetic disk of the present invention, since the protrusions portions to control the spacing are formed on the surface of the protective layer the surface of the substrate can be substantially made flat. Due to this, since the magnetic layer which is formed on the substrate is also flat, the fluctuation of the reproduction output due to the roughness of the magnetic film can be prevented in the recording or reproducing mode. A magnetic disk having excellent recording and reproducing characteristics can be obtained. However, the invention also incorporates a magnetic disk having ultramicro surface roughness, for instance, micro grooves or the like in the circumferential direction in a range smaller than the heights of protrusions which are formed on the surface of the protective layer are formed on the surface of the substrate as necessary in order to control, for instance, the crystal orientation of the magnetic layer.

In the invention, a specific method of forming protrusions on the surface of the protective layer is as follows. It is most preferable to use a method whereby a proper mask pattern is formed on the surface of the protective layer which was flatly formed so as to have a substantially uniform thickness in the surface of the disk and, after that, the etching is executed to thereby form protrusion and hollows, and the mask pattern is subsequently eliminated. The vacant volume of the hollows can be controlled by an area ratio of the portion covered by the mask pattern and an etching depth. In the invention, in order to change the vacant volume of the hollows on the different radial position, it is sufficient to use at least either one of the method of the area ratio of the portion covered by the changing mask pattern and the method of changing the etching depth of the protective layer. In the invention, since it is sufficient that the vacant volume of the hollows substantially increases as a flying height increases, at a position where the flying height is smallest, it is also possible to set the vacant volume of the hollows to zero, in other words, portions in which none of the protrusions is formed can also exist.

As a method of forming the mask pattern on the surface of the protective layer, it is desirable to use a method which can arbitrarily control the area ratio of the portions covered by the mask pattern. It is particularly preferable to use a method of forming an arbitrary pattern by a photolithography method, a method of depositing proper solid materials serving as a mask agent onto the surface of the protective film in a form of particles or solution by a spray method or the like. As a mask agent that is used here, a photoresist, an organic resin such as polyethylene or the like, a fluororesin such as polytetrafluoroethylene or the like, etc. is particularly preferable.

An etching method which is used here is selected in accordance with the material of the protective layer. In case of the protective layer made of C, a dry etching method such as a plasma etching or the like in the gas atmosphere containing oxygen is particularly desirable. It is preferable to set the maximum etching depth of the protective layer to be smaller than the thickness of protective layer which has initially been formed. This is because in the case where the magnetic layer is exposed to the surface, a deterioration of the characteristics easily occurs.

The present invention will now be explained in detail hereinbelow on the basis of more practical embodiments.

Embodiment 12

An NiP under film of 15 $\mu$m was formed on the surface of an aluminum alloy disk of an outer diameter of 5.25 inches by an electroless plating method. The under film was ground until a thickness of 10 $\mu$m. The under film was mirror-surface polished so that an average roughness ($R_a$) was equal to or less than 2 nm and the maximum roughness ($R_{max}$) was equal to or less than 5 nm when they are measured by a tracer type surface roughness measuring instrument and the substrate was formed. An intermediate layer of Cr having a thickness of 100 nm, a magnetic layer of CoCrTa having a thickness of 50 nm, and a protective layer of C having a thickness of 30 nm were respectively formed on the substrate by a sputtering method.

A positive type photoresist of about 0.5 $\mu$m was coated onto the surface of the protective layer. A photomask in which light transmitting portions were concentrically formed was closely adhered to the photoresist and was exposed by using ultraviolet lights. After that, they were developed and only the resists of the light transmitting portions were eliminated. The concentric mask patterns were formed on the surface of the protective film. As a pattern of the photomask, a pitch of the concentric light transmitting portions was set to a constant value of 50 $\mu$m over the whole surface of the disk. A width of the light transmitting portion was set to 1 $\mu$m at the innermost rim and to 49 $\mu$m at the outermost rim and was continuously changed between them. A pitch of the concentrical mask patterns which had been copy transferred was set to a constant value of 50 $\mu$m. A width of the mask patterns was set to 49 $\mu$m at the innermost rim and to 1 $\mu$m at the outermost rim and was continuously changed between them. An area ratio of the portions covered by the mask patterns was equal to 98% at the innermost rim and to 2% at the outermost rim.

The above disk was treated in the Ar atmosphere containing 10% of oxygen by a dry etching apparatus. The protective layer of the portion without a mask pattern was etched to a depth of 20 nm. After that, the mask pattern was eliminated. The portion in which the mask pattern existed became a protrusion. The portion having no mask pattern became a hollow by etching. A lubricating agent of the perfluoropolyether system of about 2 nm was coated as a lubricating film onto the disk. The magnetic disk was formed.

In the disk of the embodiment, the vacant volume of the hollow was equal to about 400 $\mu m^3/mm^2$ at the innermost rim, to about 10000 $\mu m^3/mm^2$ at the middle circumference, and to about 19600 $\mu m^3/mm^2$ at the outermost rim. As a position approaches the outer rim side, such a volume gradually increased. The vacant volume of the hollow on the same circumference was almost constant. In the embodiment, a thickness of protective layer at the protrusion was equal to about 30 nm over the whole surface. A thickness of protective layer at the hollow was equal to about 10 nm over the whole surface.

Embodiment 13

A photomask in which a pitch of the concentric light transmitting portions is set to a constant value of 50 $\mu$m over the whole surface of the disk and a width of light transmitting portion is set to a constant value of 49 $\mu$m was used. Mask patterns were formed on the surface of the protective layer by a manner similar to the embodiment 12. A pitch of the concentric mask patterns which had been copy transferred was equal to a constant value of 50 $\mu$m over the whole surface of the disk. A width of the mask patterns was equal to a constant value of 1 $\mu$m. An area ratio of the portions covered by the mask patterns was equal to 2% over the whole surface.

The above disk was treated in the Ar atmosphere containing 10% of oxygen by the dry etching apparatus while interposing a shielding plate between the electrodes. The protective layer of the portion having no mask pattern was etched. By rotating the disk during the etching and by moving the shielding plate, the etching depth of the protective layer was set to 0 at the innermost rim and to 20 nm at the outermost rim and the continuously changed between them. The mask patterns were eliminated. After that, a lubricating agent of the perfluoropolyether system serving as a lubricating film of about 2 nm was coated onto the disk. The magnetic disk was formed.

In the disk of the embodiment, the vacant volume of the hollow was equal to 0 (namely, none of the protrusion and hollow portions exists) at the innermost rim, to about 10000 $\mu m3/mm^2$ at the middle circumference and to about 19600 $\mu m^3/mm^2$ at the outermost rim. As a position approaches the outer circumferential side, such a volume gradually increased. The vacant volume of the hollow on the same circumference was almost constant. In the embodiment, a thickness of protective layer in the convex portion was equal to about 30 nm over the whole surface. A thickness of protective layer in the hollow was equal to about 20 nm at a position near the middle circumference and to about 10 nm at the outermost rim.

Embodiment 14

A photomask having lattice-shaped light transmitting portions was used and mask patterns were formed on the surface of the protective layer by a method similar to the embodiment 12. In the patterns of the photomask, a pitch of the lattice-shaped light transmitting portions was set to a constant value of 50 $\mu$m over the whole surface. A width of the light transmitting portions at the innermost ram was equal to 1 $\mu$m and a length of one side of a square light non-transmitting portion was equal to 49 $\mu$m. A width of the light transmitting portions at the outermost rim was equal to 45 $\mu$m and a length of one side of a square light non-transmitting portion was equal to 5 $\mu$m. The width of the light transmitting portions and the length of one side of a square light non-transmitting portion was continuously changed between and the intermost rim and the outermost rim. An area ratio of the portions covered by the mask patterns was equal to 96% at the innermost rim and to 1% at the outermost rim.

The protective layer of the above disk was etched by a method similar to the embodiment 12. The mask patterns were eliminated. After that, a lubricating agent of the perfluoropolyether serving as a lubricating film of about 2 nm was coated onto the disk and the magnetic disk was formed.

In the disk of the embodiment, the vacant volume of the hollow was equal to about 800 $\mu m^3/mm^2$ at the innermost rim, to about 10000 $\mu m^3/mm^2$ at the middle circumference and to about 19800 $\mu m^3/mm^2$ at the outermost rim. As a position approaches the outer circumferential side, such a volume gradually increased. The vacant volume of the hollow on the same circumference was almost constant. In the embodiment, the thickness of protective layer at the protrusions was equal to about 30 nm over the whole surface. A thickness of protective layer at the hollows was equal to about 10 nm over the whole surface.

Embodiment 15

An intermediate layer of Cr having a thickness of 100 nm, a magnetic layer of CoCrTa having a thickness of 50 nm, and a protective layer of C having a thickness of 30 nm were respectively formed onto the substrate in a manner similar to the embodiment 12.

In the embodiment, as mask patterns which are formed onto the surface of the protective film, mask patterns on which solid particles had been dispersed and deposited were used. A diffusion liquid in which polytetrafluoroethylene whose average grain diameter is equal to 5 $\mu m$ of one weight % had been dispersed into a fluorine system solvent was adjusted. The polytetrafluoroethylene particles were dispersed and deposited onto the surface of the protective layer by a spray coating method. By moving the spray nozzle while rotating the disk, the area ratio of the portions covered by the particles was changed in accordance with the radial position. The area ratio of the portions covered by the particles was equal to about 95% at the innermost rim and to about 2% at the outermost rim and was continuously changed between them.

The protective layer of 20 nm of the above disk was etched by a method similar to the embodiment 12. The particles as mask patterns were eliminated. After that, a lubricating agent of the perfluoropolyether system serving as a lubricating film of about 2 nm was coated onto the disk and the magnetic disk was formed.

In the disk of the embodiment, the vacant volume of the hollow was equal to about 1000 $\mu m^3/mm^2$ at the innermost rim, to about 10000 $\mu m^3/mm^2$ at the middle circumference and to about 19600 $\mu m^3/mm^2$ at the outermost rim. As a position approaches the outer circumferential side, such a volume gradually increased. The vacant volume of the hollow on the same circumference was almost constant. In the embodiment, a thickness of protective layer at protrusions was equal to about 30 nm over the whole surface. A thickness of protective layer at the hollows was equal to about 10 nm over the whole surface.

Embodiment 16

Figure 19A:
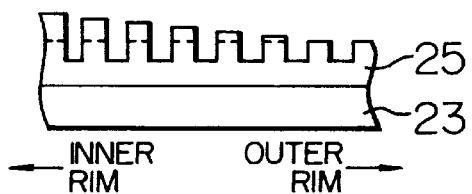
FIGS. 19A, 19B, and 19C are a cross sectional view of a magnetic disk which is formed by changing the heights of protrusions on a protective film surface in the radial direction and diagrams showing the relations between the radial position of the magnetic disk, the sliding reliability, and the electric characteristics.
Figure 19B:
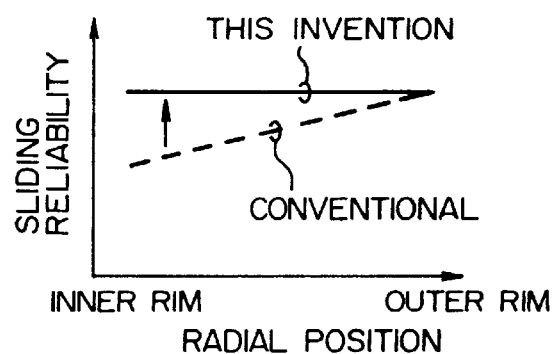
Figure 19C:
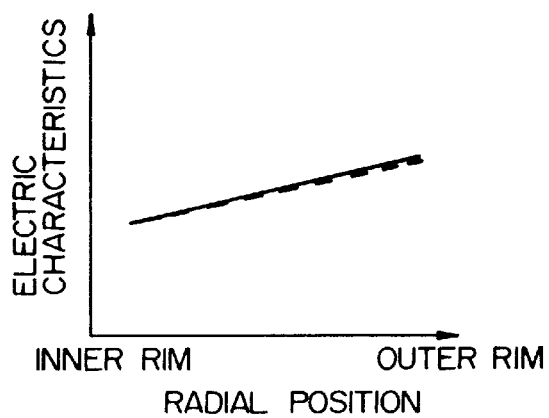
Figure 20:
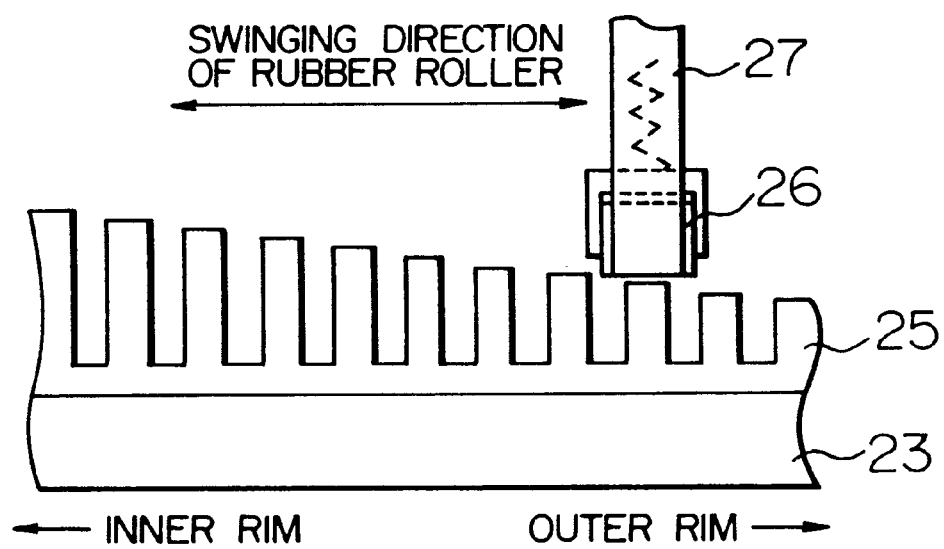
FIG. 20 is a diagram showing means for obtaining a shape of the protective film surface in FIG. 19A.

FIGS. 19A, 19B, and 19C are diagram showing surface shapes of magnetic disks formed to solve other problems. If high protrusions are formed at the radial position where an abrasion amount of the protrusions is large, i.e. where the flying height is small, the abrasion progresses and the protrusions are eliminated, so that the sliding characteristics deteriorate. The surface shapes shown in FIGS. 19A to 19C intend to prevent such a deterioration of the sliding characteristics and to improve the reliability by forming low protrusions at the radial position where an abrasion amount of the protrusions is large. In the embodiment, in order to avoid that the distance from the magnetic film of the magnetic disk to the magnetic head, i.e. the spacing, is changed, an area ratio of the protrusions is controlled to 15% or less and the height of protrusions is set to 30 nm or less. In this instance, a height of protrusions at the outer circumference at which an abrasion amount is small is set to 15 nm and the protrusions are formed so that the height of protrusion is inversely proportional to the fluctuation of the flying height in the radial direction of the magnetic disk toward the inner circumference at which an abrasion amount is large. The height of protrusion at the inner circumference is equal to 30 nm. FIG. 20 shows means for changing the height of protrusion in the radial direction in order to obtain the surface shapes shown in FIGS. 19A, 19B, and 19C. Solid particles are deposited onto the surface of the protective layer formed so as to have an almost constant thickness and are used as a mask against etching. In this state, by uniformly etching the surface, protrusions are formed. After that, the solid particles as a mask agent are eliminated and the protective layer surface having protrusions is obtained. The disk is chucked to a spindle and rotated. An abrasion tape is pressed toward the protrusions by a rubber roller and is pressurized. The rubber roller is swung in the radial direction, thereby working the whole surface. In this instance, the pressing force of the rubber roller is changed in the radial direction and a abrasion amount of the protrusions is controlled, so that desired surfaces are obtained. As another method, solid particles are deposited onto the surface of the protective layer whose thickness differs in the radial direction. When the protective layer surface is etched, an etching efficiency is changed by examining a shape of electrode in an etching apparatus. Further, by controlling a power which is applied and a flow rate and a pressure of etching gas, the etching amount in the radial direction is controlled, so that desired shapes are obtained. By the above processes, as shown in FIGS. 19A, 19B, and 19C, the deterioration of the sliding characteristics is prevented and the reliability is improved without deteriorating the electric characteristics in the radial direction of the magnetic disk. Although the embodiment has been described with respect to the case of the magnetic head moving system of the linear actuator, a similar effect can be also obtained by another method such that the height of protrusion at the radial position at which the flying height of the magnetic head is largest is set to a reference and the height is changed so as to be inversely proportional to the fluctuation of the flying height in the radial direction of the magnetic disk.

In FIGS. 19A, 19B and 20, 23 is magnetic layer, 25 is protective layer in which height of protrusion was changed in radial direction, 26 is rubber roller, 27 is abrasion tape.

COMPARISON EXAMPLE 5

An intermediate layer of Cr having a thickness of 100 nm, a magnetic layer of CoCrTa having a thickness of 50 nm, and a protective layer of C having a thickness of 30 nm were respectively formed onto the substrate in a manner similar to the Embodiment 12.

In the Comparison Example, none of the protrusions is formed on the surface of the protective layer. A lubricating agent of the perfluoropolyether system serving as a lubricating film of about 2 nm was directly coated onto the disk and the magnetic disk was formed. In the disk of the Comparison Example, none of the protrusions substantially exists on the surface and a thickness of protective film was equal to 30 nm over the whole surface.

COMPARISON EXAMPLE 6

A photomask in which a pitch of the concentric light transmitting portions was set to a constant value of 50 $\mu m$ over the whole surface of the disk and a width of light transmitting portion was set to a constant value of 25 μm was used. Mask patterns were formed onto the surface of the protective layer by a method similar to the embodiment 12. In the concentric mask patterns which had been copy transferred, a pitch was equal to a constant value of 50 μm over the whole surface of the disk. A width of mask pattern was equal to a constant value of 25 μm. An area ratio of the portions covered by the mask patterns was equal to 50% over the whole surface.

The protective layer of 20 nm of the above disk was etched by a method similar to the embodiment 12. The mask patterns were eliminated. After that, a lubricating agent of the perfluoropolyether system serving as a lubricating film of about 2 nm was coated onto the disk and the magnetic disk was formed.

In the disk of the comparison example, the vacant volume of the hollow was equal to a constant value of about 10000 $\mu m^3/mm^2$ over the whole surface of the disk. In the comparison example, thickness of protective layer at the protrusions was equal to about 30 nm over the whole surface. A thickness of protective layer at the hollows was equal to about 10 nm over the whole surface.

COMPARISON EXAMPLE 7

An intermediate layer of Cr having a thickness of 100 nm, a magnetic layer of CoCrTa having a thickness of 50 nm, and a protective layer of C having a thickness of 30 nm were respectively formed onto the substrate in a manner similar to the embodiment 12.

In the Comparison Example, none of the mask pattern is formed on the surface of the protective layer. The protective layer is etched using a similar method to the embodiment 13 with the shielding plate. By moving the shielding plate, the etching depth of the protective layer was set to 0 at the innermost rim and to 20 nm at the outermost rim and was continuously changed between them. After that, a lubricating agent of the perfluoropolyether system serving as a lubricating film of about 2 nm was coated onto the disk.

By using the disk of the embodiment 13, the relation between the vacant volume of the hollow and the spacing was measured with respect to the case where a linear velocity upon rotation of the disk is constant. The spacing was obtained by the following method.

With respect to the dual element head in which the reproducing element using a magnetoresistive effect and an induction type recording element are combined, a flat glass disk was used and the relation between the linear velocity upon rotation of the disk and the flying height was measured by a light interference method. A magnetic disk apparatus was subsequently constructed by using the above head and the disk in the embodiment 13. Recording and reproducing tests were performed in a manner such that the linear velocity of the rotation and the magnetization reversing density on the disk surface are set to be constant at several radial positions of the disk. A reproduction output at each radial position was measured. A linear actuator as a head moving mechanism was used in this experiment. As a position approaches the outer circumference side, namely, as the vacant volume of the hollow of the surface of the protective layer increases, the reproduction output increased. In the disk of the embodiment 13, since none of the protrusions and hollows exists on the surface at the innermost rim, the spacing in such a location was measured as a sum of the flying height measured by using the glass disk at the same linear velocity and the thickness of protective layer and lubricating layer. It is not presumed that a change in reproduction output which occurs when the radial position of the disk was changed and the protrusion shapes of the surface of the protective layer were changed is caused by only a change in spacing. The spacing at each radial position was calculated while using the spacing at the innermost rim as a reference.

Figure 17:
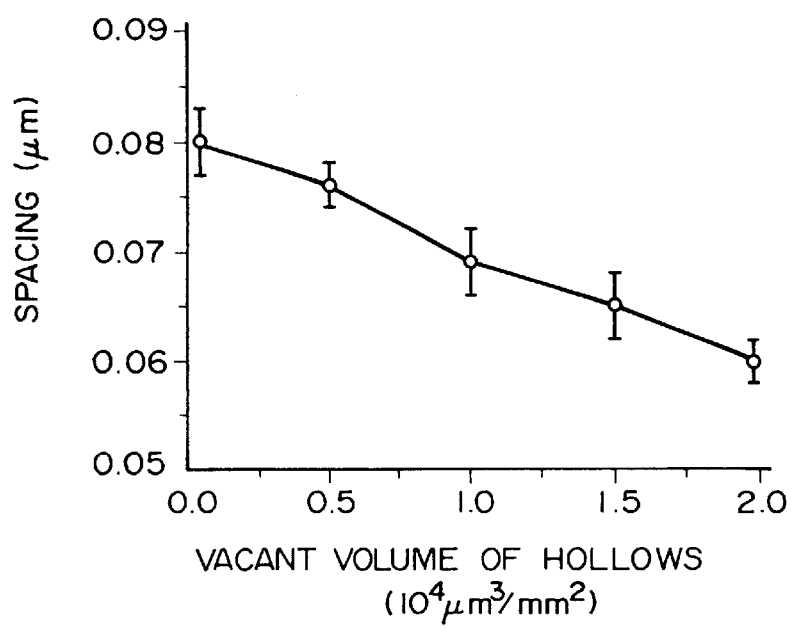
FIG. 17 is a measurement diagram showing the relation between the vacant volume of hollows and the spacing on a magnetic disk having protrusions and hollows in the surface according to an embodiment of the invention.

FIG. 17 shows the relation between the vacant volume of the hollows at the surface of the protective layer and the spacing calculated. From the results of the above measurement, it will be understood that even when the head or the linear velocity upon rotation are the same, the spacing can be controlled by changing the vacant volume of the hollows formed on the surface of the disk.

Magnetic disk apparatus were subsequently constructed by using heads similar to those mentioned above with respect to the disks in each of the above embodiments and Comparison Examples. The changes in spacing in accordance with the radial position of the disk when the disk had been rotated at a constant rotational speed were measured. The spacing was obtained by the following method.

Figure 18:
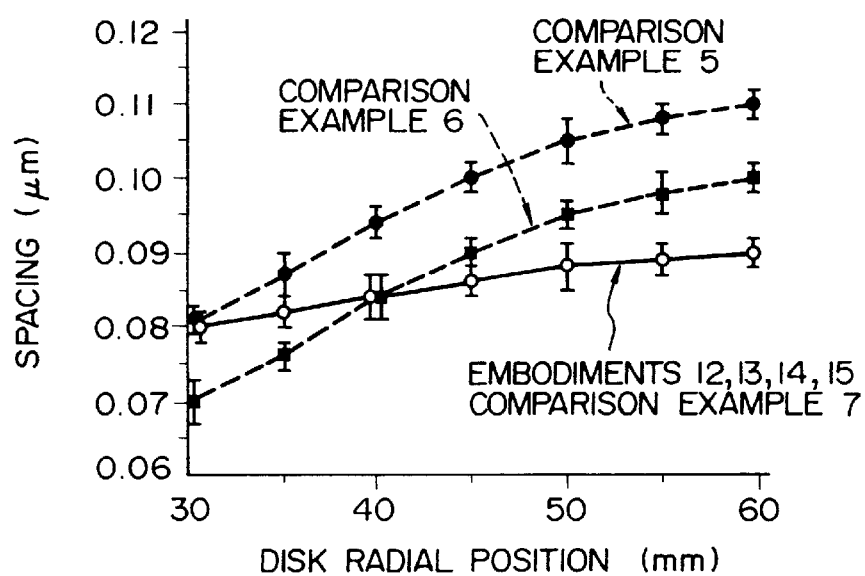
FIG. 18 is a measurement diagram showing the relation between the radial position and the spacing in the magnetic disk according to the embodiment of the invention.

In a manner similar to that mentioned above, the flying height of the trial heads at each radial position when the glass disk had been used and the disk had been rotated at a constant rotational speed were measured. With respect to the disk of the Comparison Example 5 in which none of the protrusions exists on the surface, the recording and reproducing tests were executed under conditions such that the rotational speed is constant and the magnetization reversing density at the disk surface is constant. The reproduction output at each radial position was measured. The spacing was calculated as a sum of the flying height measured by using the glass disk at the same radial position and the thicknesses of protective layer and lubricating layer. With respect to the disks in the other embodiments and comparison examples, the reproduction outputs were measured under the same conditions as those mentioned above. With regard to each disk, it is now assumed that a difference between the reproduction outputs of each of the above disks and the disk of the Comparison Example 5 is caused by only a change in spacing. The spacing at each radial position was calculated while using the spacing in the comparison example 5 as a reference. FIG. 18 shows the relation between the radial position and the spacing with respect to the disks in the embodiments and Comparison Examples.

In the Comparison Example 5 in which none of the protrusions exists on the surface, as a position approaches the outer circumferential side, the spacing remarkably increased. In the Comparison Example 6 in which the vacant volume of the hollow in the disk surface is constant, the absolute value of the spacing decreased as compared with that in the Comparison Example 5. However, as a position approaches the outer circumferential side, the spacing also similarly increased. On the other hand, in all of the embodiments in which as a position approaches the outer circumferential side, the vacant volume of the hollow was increased and in the Comparison Example 7 in which as a position approaches the outer circumferential side, the thickness of protective layer was decreased, it will be understood that the spacing changes depending on the radial position are almost equal and the increase in spacing at the outer circumference was remarkably suppressed.

With respect to the magnetic disk apparatuses in the above embodiments and Comparison Examples, recording and reproducing tests were performed while changing a recording density at the innermost rim and outermost rim of the disk. The maximum magnetization reversing densities at the disk surfaces which can be put into practical use were measured. In these measurements, a linear actuator was used as a head moving mechanism. Further, with regard to the same magnetic disk apparatuses, the reliabilities and durabilities were evaluated by CSS tests at the innermost rim and outermost rim of the disk. The results of the measurement are shown in the following Table 2.

TABLE 2

| Disk | Position | Max. magnetization reversing density (kFCI) | CSS test (after 30000 rotations) | |
|---|---|---|---|---|
| | | | Result of observation of surface | Frictional force (gf) |
| Embodiment 12 | Innermost rim | 75 | no scratch | 12 |
| | Outermost rim | 71 | no scratch | 5 |
| Embodiment 13 | Innermost rim | 76 | no scratch | 15 |
| | Outermost rim | 70 | no scratch | 4 |
| Embodiment 14 | Intermost rim | 75 | no scratch | 11 |
| | Outermost rim | 70 | no scratch | 5 |
| Embodiment 15 | Innermost rim | 74 | no scratch | 13 |
| | Outermost rim | 71 | no scratch | 4 |
| Comparison Example 5 | Innermost rim | 75 | no scratch | 21 |
| | Outermost rim | 42 | no scratch | 17 |
| Comparison Example 6 | Innermost rim | 82 | crash | — |
| | Outermost rim | 55 | no scratch | 11 |
| Comparison Example 7 | Innermost rim | 74 | no scratch | 22 |
| | Outermost rim | 70 | crash | — |

In the Comparison Example 5 in which the spacing largely increased on the outer circumference side, a decrease in maximum magnetization reversing density on the outer circumference side is large and it is disadvantageous in terms of the recording and reproducing characteristics. As compared with the Comparison Example 5, in the Comparison Example 6 in which the absolute value of the spacing decreased, although the maximum magnetization reversing density on the inner circumferential side increased, the maximum magnetization reversing density also decreased on the outer circumferential side. According to the Comparison Example 6, further, crashes occurred on the inner circumferential side after the CSS tests has been executed and the durability was poor. In the Comparison Example 6, it is considered that since the spacing excessively decreased on the inner circumferential side, the sliding reliability was lost.

In all of the Embodiments and the Comparison Example 7 in which the increase in spacing on the outer circumferential side was small, the decrease in maximum magnetization reversing density on the outer circumferential side is small, the recording density per one track can be set to a high value on the outer circumferential side. It will be understood that it is suitable for realization of a high recording density as a whole apparatus. In the Comparison Example 7, however, crashes occurred on the outer rim side after completion of the CSS tests and the durability was poor. in the Comparison Example 7, it is considered that since the thickness of protective layer on the outer circumferential side is small, the sliding reliability was lost. On the other hand, according to the magnetic disk apparatus of the embodiment, no scratch was found out even after completion of the CSS tests and the excellent reliability was also obtained.

In the embodiments of the invention, a linear autuator was used as a head moving mechanism. In this case, the flying height becomes maximum at the outer rim side due to an increase in linear velocity.

When the other actuator is used as a head moving mechanism, for example, a rotary actuator is used, the flying height may not becomes maximum at the outer rim side depending on a change in linear velocity and the skew angle of the head. Even in this case, if a vacant volume of the hollow on the protective layer of the disk is set maximum at the radial position where the flying height becomes maximum, this invention can be applied for controlling the spacing on the different radial position.

In the embodiments of the invention, on the other hand, the frictional force after completion of the CSS tests was obviously low at the outermost rim. It is considered that this is because since the vacant volume of The hollow at the outermost rim is large, an adhering phenomenon between the head and the disk is difficult to occur. Therefore, in case of using the embodiment in the magnetic disk apparatus of the CSS system, by setting a CSS region at a location near the outermost rim, the adhering phenomenon between the head and the disk can be prevented. A magnetic disk apparatus having a more excellent reliability can be obtained.

What is claimed is:

1. A magnetic disk comprising:
    a substrate;
    a magnetic layer; and
    a protective layer;
    wherein the magnetic disk includes a contact start/stop region and a data region;
    wherein the contact start/stop region of the magnetic disk has protrusions;
    wherein the protrusions are discrete protrusions aligned in a spiral direction of the magnetic disk at a predetermined spacing in a radial direction of the magnetic disk;
    wherein the contact start/stop region of the magnetic disk has flat areas between the protrusions; and
    wherein at least some of the flat areas extend continuously from an inner radius of the contact start/stop region of the magnetic disk to an outer radius of the contact start/stop region of the magnetic disk.

2. A magnetic disk according to claim 1, wherein a height of each of the protrusions is not less than 5 nm and not greater than 40 nm, and is within ±30% of an average height of the protrusions;
    wherein a density of the protrusions is not less than 200/mm$^2$ and is not greater than 250,000/mm$^2$;
    wherein a width of a surface of each of the protrusions in the radial direction of the magnetic disk is not less than 0.1 µm and is not greater than 10 µm; and
    wherein a distance between ones of the protrusions closest to each other is 0.2 µm to 50 µm.

3. A magnetic disk according to claim 1, wherein the discrete protrusions are aligned in the spiral direction of the magnetic disk at the predetermined spacing in the radial direction of the magnetic disk such that the discrete protrusions are distributed anisotropically in the contact start/stop region of the magnetic disk.

4. A magnetic disk comprising:

a substrate;

a magnetic layer; and a protective layer;

wherein the magnetic disk includes a contact start/stop region and a data region;

wherein the contact start/stop region of the magnetic disk has protrusions on the protective layer of the magnetic disk;

wherein the protrusions are discrete protrusions aligned in a spiral direction of the magnetic disk at a predetermined spacing in a radial direction of the magnetic disk;

wherein the contact start/stop region of the magnetic disk has flat areas between the protrusions; and wherein at least some of the flat areas extend continuously from an inner radius of the contact start/stop region of the magnetic disk to an outer radius of the contact start/stop region of the magnetic disk.

5. A magnetic disk according to claim 4, wherein a height of each of the protrusions is not less than 5 nm and not greater than 40 nm, and is within ±30% of an average height of the protrusions;

wherein a density of the protrusions is not less than 200/mm$^2$ and is not greater than 250,000/mm2;

wherein a width of a surface of each of the protrusions in the radial direction of the magnetic disk is not less than 0.1 μm and is not greater than 10 μm; and wherein a distance between ones of the protrusions closest to each other is 0.2 μm to 50 μm.

6. A magnetic disk according to claim 4, wherein the discrete protrusions are aligned in the spiral direction of the magnetic disk at the predetermined spacing in the radial direction of the magnetic disk such that the discrete protrusions are distributed anisotropically in the contact start/stop region of the magnetic disk.

7. A magnetic disk comprising:

a substrate;

a magnetic layer; and a protective layer;

wherein the magnetic disk includes a contact start/stop region and a data region;

wherein the contact start/stop region of the magnetic disk has protrusions;

wherein the protrusions are discrete protrusions aligned in a spiral direction of the magnetic disk at a predetermined spacing in a radial direction of the magnetic disk;

wherein the contact start/stop region of the magnetic disk has flat areas between the protrusions;

wherein at least some of the flat areas extend continuously from an inner radius of the contact start/stop region of the magnetic disk to an outer radius of the contact start/stop region of the magnetic disk;

wherein the protrusions are formed on the substrate; and wherein a shape of the magnetic layer and a shape of the protective layer conform to a shape of the substrate.

8. A magnetic disk according to claim 7, wherein a height of each of the protrusions is not less than 5 nm and not greater than 40 nm, and is within ±30% of an average height of the protrusions;

wherein a density of the protrusions is not less than 200/mm$^2$ and is not greater than 250,000/mm$^2$;

wherein a width of a surface of each of the protrusions in the radial direction of the magnetic disk is not less than 0.1 μm and is not greater than 10 μm; and wherein a distance between ones of the protrusions closest to each other is 0.2 μm to 50 μm.

9. A magnetic disk according to claim 7, wherein the discrete protrusions are aligned in the spiral direction of the magnetic disk at the predetermined spacing in the radial direction of the magnetic disk such that the discrete protrusions are distributed anisotropically in the contact start/stop region of the magnetic disk.

10. A substrate for a magnetic disk, wherein the substrate includes a first region corresponding to a contact start/stop region of the magnetic disk and a second region corresponding to a data region of the magnetic disk;

wherein the first region of the substrate has protrusions;

wherein the protrusions are discrete protrusions aligned in a spiral direction of the substrate at a predetermined spacing in a radial direction of the substrate;

wherein the first region of the substrate has flat areas between the protrusions; and wherein at least some of the flat areas extend continuously from an inner radius of the first region of the substrate to an outer radius of the first region of the substrate.

11. A substrate for a magnetic disk according to claim 10, wherein a height of each of the protrusions is not less than 5 nm and not greater than 40 nm, and is within ±30% of an average height of the protrusions;

wherein a density of the protrusions is not less than 200/mm$^2$ and is not greater than 250,000/mm$^2$;

wherein a width of a surface of each of the protrusions in the radial direction of the substrate is not less than 0.1 μm and is not greater than 10 μm; and wherein a distance between ones of the protrusions closest to each other is 0.2 μm to 50 μm.

12. A substrate for a magnetic disk according to claim 10, wherein the discrete protrusions are aligned in the spiral direction of the substrate at the predetermined spacing in the radial direction of the substrate such that the discrete protrusions are distributed anisotropically in the first region of the substrate.

* * * * *

UNITED STATES PATENT AND TRADEMARK OFFICE
CERTIFICATE OF CORRECTION

PATENT NO.     : 6,303,205 B1
DATED          : October 16, 2001
INVENTOR(S)    : Tanaka et al.

It is certified that error appears in the above-identified patent and that said Letters Patent is hereby corrected as shown below:

<u>Title page,</u>
Delete Item [30] in its entirety and replace it with the following replacement Item [30]:
-- [30]        Foreign Application Priority Data
Oct. 13, 1989    (JP) ................................................. 1-264934
Mar. 2, 1990     (JP) ................................................. 2-049281
Apr. 13, 1990    (JP) ................................................. 2-096448
Jun. 19, 1992    (JP) ................................................. 4-160802
Jun. 25, 1992    (JP) ................................................. 4-167265 --

Signed and Sealed this

Tenth Day of June, 2003

JAMES E. ROGAN
*Director of the United States Patent and Trademark Office*